US007271330B2

(12) United States Patent
Akazawa et al.

(10) Patent No.: US 7,271,330 B2
(45) **Date of Patent: *Sep. 18, 2007**

(54) RENDITION STYLE DETERMINATION APPARATUS AND COMPUTER PROGRAM THEREFOR

(75) Inventors: Eiji Akazawa, Hamamatsu (JP); Yasuyuki Umeyama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 157 days.

This patent is subject to a terminal disclaimer.

(21) Appl. No.: 10/641,632

(22) Filed: Aug. 15, 2003

(65) Prior Publication Data

US 2004/0055449 A1 Mar. 25, 2004

(30) Foreign Application Priority Data

Aug. 22, 2002 (JP) ............................ 2002-241834

(51) Int. Cl.
*G01P 3/00* (2006.01)

(52) U.S. Cl. ........................................ 84/626; 704/500

(58) Field of Classification Search .................. 84/604, 84/662, 626, 622; 342/357; 704/266, 500
See application file for complete search history.

(56) References Cited

U.S. PATENT DOCUMENTS

| | | | | |
|---|---|---|---|---|
| 5,541,357 | A | 7/1996 | Sato et al. | 84/626 |
| 6,150,598 | A | 11/2000 | Suzuki et al. | |
| 6,255,576 | B1 | 7/2001 | Suzuki et al. | 84/604 |
| 6,362,411 | B1 | 3/2002 | Suzuki et al. | |
| 6,365,818 | B1 * | 4/2002 | Suzuki | 84/604 |
| 6,392,135 | B1 | 5/2002 | Kitayama | 84/622 |
| 6,452,082 | B1 | 9/2002 | Suzuki et al. | 342/357.04 |
| 6,584,442 | B1 * | 6/2003 | Suzuki et al. | 704/500 |
| 6,798,427 | B1 * | 9/2004 | Suzuki et al. | 84/662 |
| 6,881,888 | B2 * | 4/2005 | Akazawa et al. | 84/604 |
| 6,911,591 | B2 * | 6/2005 | Akazawa et al. | 84/616 |
| 2002/0143545 | A1 | 10/2002 | Tamura et al. | 704/266 |
| 2003/0084778 | A1 * | 5/2003 | Suzuki et al. | 84/604 |

FOREIGN PATENT DOCUMENTS

| | | |
|---|---|---|
| JP | 2000-122665 | 4/2000 |
| JP | 2000-221982 | 8/2000 |
| JP | 2001-215973 | 8/2001 |

* cited by examiner

*Primary Examiner*—Lincoln Donovan
*Assistant Examiner*—Jianchun Qin
(74) *Attorney, Agent, or Firm*—Morrison & Foerster LLP

(57) ABSTRACT

There is provided a rendition style selector operable by a user to select a desired rendition style from among a plurality of rendition styles associated with a plurality of portions of tones. In response to selecting operation via the selector, a rendition style is determined which is to be applied to each desired portion of a tone. Then, performance information is output which designates a rendition style module corresponding to the determined rendition style. The module defines a waveform characteristic to provide the corresponding rendition style. According to another type of the rendition style selector, a user can collectively select a combination of a plurality of rendition styles associated with different portions of a tone. Thus, a plurality of rendition styles can be designated collectively by one selecting operation. Rendition style suitable for each portion of a tone to be generated may be determined on the basis of a performance event.

17 Claims, 12 Drawing Sheets

| TO-BE-USED SWITCH NO. | TO-BE-DISPLAYED RENDITION STYLE NAME | INPUT | | OUTPUT | |
|---|---|---|---|---|---|
| | | CONTROLLER NO. | CONTROLLER VALUE | CONTROLLER NO. | CONTROLLER VALUE |
| ① | SLOW BENDUP | 0x10 | 0x01 | 0x20 | 0x01 |
| ② | GLISSUP | 0x10 | 0x02 | 0x20 | 0x03 |
| ③ | VIBRATO | 0x11 | 0x01 | 0x21 | 0x01 |
| ④ | SLOW BENDDOWN | 0x12 | 0x01 | 0x22 | 0x01 |
| ⑤ | DEEP GLISSDOWN | 0x12 | 0x02 | 0x22 | 0x03 |

FIG. 3A

| TO-BE-USED SWITCH NO. | TO-BE-DISPLAYED RENDITION STYLE NAME | INPUT | | VALIDITY CONDITION | | OUTPUT | |
|---|---|---|---|---|---|---|---|
| | | CONTROLLER NO. | CONTROLLER VALUE | PITCH INTERVAL LOWER LIMIT | PITCH INTERVAL UPPER LIMIT | CONTROLLER NO. | CONTROLLER VALUE |
| ⑥ | GLISS JOINT | 0x13 | 0x01 | 12 | 12 | 0x23 | 0x01 |
| ⑦ | BEND JOINT | 0x13 | 0x02 | 1 | 3 | 0x23 | 0x02 |
| ⑥ | SPECIAL JOINT | 0x13 | 0x01 | 12 | 12 | 0x23 | 0x01 |
| | | | | 1 | 3 | 0x23 | 0x02 |

FIG. 3B

| TO-BE-USED SWITCH NO. | TO-BE-DISPLAYED RENDITION STYLE NAME | INPUT | | OUTPUT | |
|---|---|---|---|---|---|
| | | CONTROLLER NO. | CONTROLLER VALUE | CONTROLLER NO. | CONTROLLER VALUE |
| ⑧ | BEND GLISS | 0x14 | 0x01 | 0x20 | 0x01 |
| | | | | 0x21 | 0x00 |
| | | | | 0x22 | 0x03 |
| ⑨ | VIBRATO GLISS | 0x14 | 0x02 | 0x20 | 0x00 |
| | | | | 0x21 | 0x01 |
| | | | | 0x22 | 0x01 |

FIG. 3C

| TO-BE-USED SWITCH NO. | TO-BE-DISPLAYED RENDITION STYLE NAME | RENDITION STYLE SWITCH INPUT | | RENDITION STYLE SLIDER INPUT | | | OUTPUT | |
|---|---|---|---|---|---|---|---|---|
| | | CONTROLLER NO. | CONTROLLER VALUE | CONTROLLER NO. | CONTROLLER VALUE | | CONTROLLER NO. | CONTROLLER VALUE |
| | | | | | LOWER LIMIT | UPPER LIMIT | | |
| ① | BENDUP | 0x10 | 0x01 | 0x50 | 0x00 | 0x3F | 0x20 | 0x01 |
| | | | | | 0x40 | 0x7F | 0x20 | 0x02 |
| ⑤ | GLISS | 0x12 | 0x02 | 0x54 | 0x00 | 0x1F | 0x22 | 0x03 |
| | | | | | 0x20 | 0x3F | 0x22 | 0x04 |
| | | | | | 0x40 | 0x5F | 0x22 | 0x05 |
| | | | | | 0x60 | 0x7F | 0x22 | 0x26 |

FIG. 3D

| SW | 1 | 2 | 3 | 4 | 5 | 6 | 7 | 8 |
|---|---|---|---|---|---|---|---|---|
| CONTROLLER NO. | 0x50 | 0x50 | 0x50 | 0x50 | 0x50 | 0x50 | 0x50 | 0x50 |
| CONTROLLER VALUE | 0x00 | 0x10 | 0x20 | 0x30 | 0x40 | 0x50 | 0x60 | 0x7F |

RENDITION STYLE DETERMINATION APPARATUS AND COMPUTER PROGRAM THEREFOR

BACKGROUND OF THE INVENTION

The present invention relates generally to rendition style determination apparatus and computer programs for determining various rendition styles (or various types of articulation) to be imparted to tones, voices or other desired sounds in response to user's operation of predetermined rendition style switches. More particularly, the present invention relates to an improved rendition style determination apparatus and computer program which allow a user to given rendition style instructions with increased flexibility by only operating individual rendition style switches.

Recently, there have been known a tone waveform control technique called "SAEM" (Sound Articulation Element Modeling), which is intended for realistic reproduction and control of various rendition styles (various types of articulation) peculiar to natural musical instruments (e.g., Japanese Patent Laid-open Publication No. 2000-122665). In tone generators using the SAEM technique, a plurality of rendition style modules, such as attack-, release-, body- and joint-related rendition style modules, are combined in a time-serial fashion to create a continuous tone waveform. For example, the SAEM technique can produce a waveform of a tone by applying an attack-related rendition style module to a rise portion (i.e., attack portion) of the tone, a body-related rendition style module to a steady portion (i.e., body portion) of the tone and a release-related rendition style module to a fall portion (i.e., release portion) of the tone and then connecting together partial waveforms of individual sections defined by these rendition style modules. Also, the SAEM technique can produce a continuous tone waveform of a plurality of tones where adjacent tones (or tone portions) are interconnected with a desired rendition style using a joint-related rendition style module. Note that, throughout this specification, the terms "tone waveform" are used to mean a waveform of a tone, voice or any desired sound rather than being limited only to a waveform of a musical tone.

Generally, the conventional tone generators using the SAEM technique are arranged to generate a tone waveform by applying a user-desired rendition style in response to user's operation of a predetermined rendition style switch. However, with such conventional tone generators where rendition style instructions are given via predetermined rendition style switches, it is not possible to appropriately instruct a rendition style to be applied to each desired portion, such as an attack, body, release or joint portion, of a tone. Namely, the conventional tone generators present the problem that the user is unable to give rendition style instructions with high flexibility so that there can not be generated tone waveforms faithfully reproducing various rendition styles (or various types of articulation) peculiar to natural musical instruments.

Further, in the conventional tone generators, only one rendition style can be designated at one time by operation of a rendition style switch; thus, when a given rendition style switch is operated and then another rendition style switch is operated in succession, the rendition style instruction by the given (i.e., earlier-operated) rendition style switch is cleared upon operation of the other (i.e., later-operated) rendition style switch. Therefore, separate information, such as a rendition style code, specifying a rendition style instructed by a rendition style switch has to be placed immediately before each performance range (one or more performance events) to which the rendition style is to be applied. Namely, an attack-related rendition style module has to be placed immediately before note-on event timing of each note to which the rendition style is to be applied, a body-related rendition style module has to be placed between note-on and note-off timing of each note, and a release-related rendition style module has to be placed immediately before note-off timing of each note. In addition, it is necessary to separately designate in advance a performance range where each desired rendition style is to be applied. For these reasons, with the conventional tone generators, it has been extremely difficult to instruct a rendition style during a real-time performance.

SUMMARY OF THE INVENTION

In view of the foregoing, it is an object of the present invention to provide a rendition style determination apparatus and computer program which can readily generate a characteristic tone waveform, having a rendition style (or articulation) duly reflected therein, with ease and ample controllability by permitting designation of a rendition style to be imparted per tone portion that is composed of one or more tones, such as an attack, body, release or joint portion.

According to a first aspect of the present invention, there is provided a rendition style determination apparatus, which comprises: a rendition style selector operable by a user to select a desired rendition style from among a plurality of rendition styles associated with a plurality of portions of tones; a rendition style determination section that, in response to rendition style selecting operation performed via the rendition style selector, determines a rendition style to be applied to each portion of a tone; and an output section that outputs performance information designating a rendition style module corresponding to the determined rendition style, the rendition style module defining a waveform characteristic to provide the rendition style corresponding thereto. Because a rendition style to be imparted or applied is determined for each individual portion of a tone (or tone portion) in response to rendition style selecting operation performed via the rendition style selector, the present invention can generate in real time, for each portion of the tone, a high-quality rendition style waveform having a user-desired rendition style duly reflected therein, with ease and with ample controllability.

As an example, the rendition style determination apparatus may further comprise a performance information acquisition section that acquires tone performance information, and, in response to rendition style selecting operation performed via the rendition style selector, the rendition style determination section may determine a rendition style suitable for a portion of a tone to be generated that is determined in accordance with the tone performance information acquired by the performance information acquisition section.

As an example, the tone performance information is performance information of a MIDI format, and the output section may output, in the MIDI format, the performance information designating the rendition style module, by incorporating the performance information in a stream of the tone performance information.

As an example, the performance information includes event data indicative of a note-on or note-off event, the rendition style determination section determines a rendition style to be performed in correspondence with event timing indicated by the event data or other timing before or after the event timing, and the output section outputs the performance information designating the rendition style module corresponding to the determined rendition style in association with predetermined timing when the determined rendition style is to be performed.

As an example, the rendition style determination apparatus may further comprise a controller (e.g., slider operator) operable by the user to control a rendition style, and the rendition style determination section may determine a rendition style in accordance with a combination of rendition style selecting operation performed via the rendition style selector and a control value of the controller.

According to a second aspect of the present invention, there is provided a rendition style determination apparatus, which comprises: a rendition style selector operable by a user to collectively select a combination of a plurality of rendition styles associated with different portions of a tone; a rendition style determination section that, in response to rendition style selecting operation performed via the rendition style selector, collectively determines rendition styles to be applied to individual portions of a tone; and an output section that outputs performance information designating rendition style modules corresponding to the rendition styles determined by the rendition style determination section, the rendition style modules each defining a waveform characteristic to provide the rendition style corresponding thereto. With such arrangements, rendition styles to be applied to individual portions of a tone can be conveniently selected in a collective fashion through one rendition style selecting operation.

According to a third aspect of the present invention, there is provided a rendition style determination apparatus, which comprises: a rendition style selector operable by a user to select a desired rendition style; a performance event acquisition section that acquires a performance event; a rendition style determination section that, in response to rendition style selecting operation performed via the rendition style selector, determines a rendition style suitable for a portion of a tone to be generated that is determined in accordance with the performance event acquired by the performance event acquisition section; and an output section that outputs performance information, designating a rendition style module corresponding to the determined rendition style, in association with predetermined timing when the performance information is to be performed, the rendition style module defining a waveform characteristic to provide the rendition style corresponding thereto. With such arrangements, a rendition style to be applied to each portion of a tone can be selected or instructed at appropriate timing; thus, the user can readily instruct at any time whether a rendition style should be applied or not.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

While the embodiments to be described herein represent the preferred form of the present invention, it is to be understood that various modifications will occur to those skilled in the art without departing from the spirit of the invention. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which:

FIGS. 3A-3D are conceptual diagrams showing examples of determination condition list data employed in the embodiment;

DETAILED DESCRIPTION OF THE EMBODIMENTS

Figure 1:
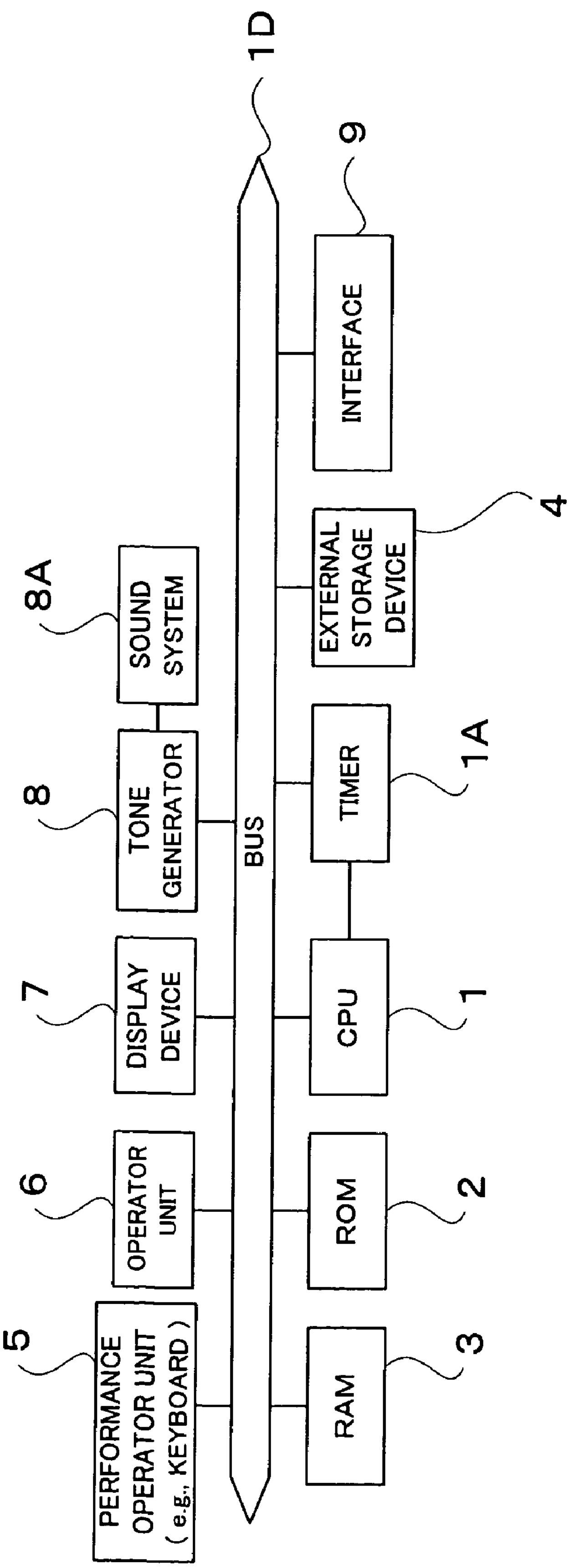
FIG. 1 is a block diagram showing an exemplary hardware organization of an electronic musical instrument employing a rendition style determining apparatus in accordance with an embodiment of the present invention.

FIG. 1 is a block diagram showing an exemplary hardware organization of an electronic musical instrument employing a rendition style determining apparatus in accordance with an embodiment of the present invention. The electronic musical instrument illustrated here is implemented using a computer, and predetermined rendition style determining processing is carried out by the computer executing predetermined rendition style determining processing programs (software). Of course, the rendition style determining processing may be implemented by microprograms to be executed by a DSP (Digital Signal Processor), rather than by such computer software. Also, the rendition style determining processing of the present invention may be implemented by a dedicated hardware apparatus having discrete circuits or integrated or large-scale integrated circuit incorporated therein. Further, the rendition style determining apparatus of the present invention may be embodied as an electronic musical instrument, automatic performance apparatus, such as a sequencer, karaoke apparatus, electronic game apparatus, multimedia-related apparatus, personal computer or any other desired form of product. Namely, the rendition style determining apparatus of the present invention may be constructed in any desired manner as long as it can impart ordinary MIDI information, such as note-on or note-off event data generated in response to operation on a performance operator unit 5 like a keyboard, with a predetermined rendition style corresponding to user's operation of a rendition style selecting switch (hereinafter referred to simply as a rendition style switch). Note that, while the electronic musical instrument employing the rendition style determining apparatus to be described below may include other hardware than the above-mentioned, it will hereinafter be described in relation to a case where only necessary minimum resources are used.

In the electronic musical instrument of FIG. 1, various operations are carried out under control of a microcomputer including a microprocessor unit (CPU) 1, a read-only memory (ROM) 2 and a random access memory (RAM) 3. The CPU 1 controls operation of the entire electronic musical instrument. To the CPU 1 are connected, via a communication bus (e.g., data and address bus) 1D, the ROM 2, RAM 3, external storage device 4, performance operator unit 5, operator unit 6, display device 7, tone generator 8 and interface 9. Also connected to the CPU 1 is a timer 1A for counting various times, for example, to signal interrupt timing for timer interrupt processes. Namely, the timer 1A generates tempo clock pulses for counting a time interval or setting a performance tempo with which to perform a music piece in accordance with given performance information. The frequency of the tempo clock pulses is adjustable, for example, via a tempo-setting switch of the operator unit 6. Such tempo clock pulses generated by the timer 1A are given to the CPU 1 as processing timing instructions or as interrupt instructions. The CPU 1 carries out various processes in accordance with such instructions. The various processes carried out by the CPU 1 in the instant embodiment include: the "rendition style determining processing" for automatically imparting ordinary performance information with rendition styles peculiar to a desired one of various musical instruments in order to achieve a more natural and vivid performance (as will be later described in relation to FIGS. 5-8); and tone synthesis processing for synthesizing tones using rendition style modules corresponding to the imparted rendition styles (as will be later described in relation to FIG. 10).

The ROM 2 stores therein various data, such as determination condition list data for assigning some of general-purpose switches, sliders and other operators of the operator unit 6 as rendition style designating switches and sliders and rendition style modules to be used for generating tones corresponding to rendition styles peculiar to various musical instruments, as well as various control programs, such as the "rendition style determining processing" and "tone synthesis processing" to be referred to or executed by the CPU 1. The RAM 3 is used as a working memory for temporarily storing various data generated as the CPU 1 executes predetermined programs, and as a memory for storing a currently-executed program and data related to the currently-executed program. Predetermined address regions of the RAM 3 are allocated to various functions and used as various registers, flags, tables, memories, etc. Similarly to the ROM 2, the external storage device 4 is provided for storing various data, such as determination condition list data and rendition style modules, and various control programs to be executed by the CPU 1. In a case where a particular control program is not prestored in the ROM 2, the control program may be prestored in the external storage device (e.g., hard disk device) 4, so that, by reading the control program from the external storage device 4 into the RAM 3, the CPU 1 is allowed to operate in exactly the same way as in the case where the particular control program is stored in the ROM 2. This arrangement greatly facilitates version upgrade of the control program, addition of a new control program, etc. The external storage device 4 may use any of various removable-type recording media other than the hard disk (HD), such as a flexible disk (FD), compact disk (CD-ROM or CD-RAM), magneto-optical disk (MO) and digital versatile disk (DVD); alternatively, the external storage device 4 may comprise a semiconductor memory. It should be appreciated that other data than the above-mentioned may be stored in the ROM 2, external storage device 4 and RAM 3.

The performance operator unit 5 is, for example, a keyboard including a plurality of keys operable to select pitches of tones to be generated and key switches corresponding to the keys. The performance operator unit 5 generates MIDI information for a tone performance; that is, the performance operator unit 5 generates MIDI information, such as note-on and note-off event information, in response to ON/OFF operation by the user or human player. It should be obvious that the performance operator unit 5 may be other than the keyboard, such as a neck-like device having tone-pitch-selecting strings provided thereon. The operator unit 6 includes various operators, such as general-purpose switches that are, for example, turned on by being depressed and turned off by being released, general-purpose sliders operable to generate predetermined control information in response to their operated amounts and determination condition inputting switches operable to input or change determination conditions for rendition style impartment (i.e., determination condition list data). The general-purpose switches and sliders are assigned as rendition style switches and rendition style sliders in accordance with the determination condition list data. Needless to say, the operator unit 6 may include other operators, such as a numerical-value-data inputting ten-button keypad and character-data inputting keyboard operable to select, set and control tone pitches, colors, effects, volume, etc. with which tones are to be performed. Note that some of the operators of the performance operator unit 5 may be used as input means such as rendition style switches and determination condition inputting switches. For example, the display device 7 comprises a liquid crystal display (LCD), CRT (Cathode Ray Tube) and/or the like positioned near the general-purpose switches and sliders. The display device 7 includes a plurality of display elements disposed adjacent to individual operators of the performance unit 6 for displays names of rendition styles in accordance with the determination condition list data, so that the general-purpose switches and sliders can be used as rendition style switches and rendition style sliders. The display device 7 includes a section for displaying controlling states of the CPU 1.

The tone generator 8, which is capable of simultaneously generating tone signals in a plurality of tone generation channels, receives MIDI information supplied via the communication bus 1D and generates tone signals on the basis of the received MIDI information. Namely, as a rendition style module corresponding to the MIDI information is read out from the ROM 2 or external storage device 4, waveform data defined by the read-out MIDI information are delivered via a bus to the tone generator 8 and stored in a buffer of the tone generator 8 as necessary. Then, the tone generator 8 outputs the buffered waveform data at a predetermined output sampling frequency. Tone signals generated by the tone generator 8 are subjected to predetermined digital processing performed by a not-shown effect circuit (e.g., DSP (Digital Signal Processor)), and the tone signals having undergone the digital processing are supplied to a sound system 8A for audible reproduction or sounding.

The interface 9, which is, for example, a MIDI interface or communication interface, is provided for communicating various MIDI information between the electronic musical instrument and external or other MIDI equipment (not shown). The MIDI interface functions to input performance information based on the MIDI standard (MIDI information) from the other MIDI equipment or the like to the electronic musical instrument, or output MIDI information from the electronic musical instrument to the other MIDI equipment or the like. The other MIDI equipment may be of any type (or operating type), such as the keyboard type, guitar type, wind instrument type, percussion instrument type or gesture type, as long as it can generate MIDI information in response to operation by a user of the equipment. The MIDI interface may be a general-purpose interface rather than a dedicated MIDI interface, such as RS232-C, USB (Universal Serial Bus) or IEEE1394, in which case other data than MIDI information may be communicated at the same time. The communication interface is connected to a wired communication network (not shown), such as a LAN, Internet, telephone line network, or wireless communication network (not shown), via which the communication interface is connected to an external server computer or the like. Thus, the communication interface functions to input various information, such as a control program and various information, such as MIDI information, from the server computer to the electronic musical instrument. Such a communication interface may be capable of both wired and wireless communication rather than just one of wired and wireless communication.

Figure 2:
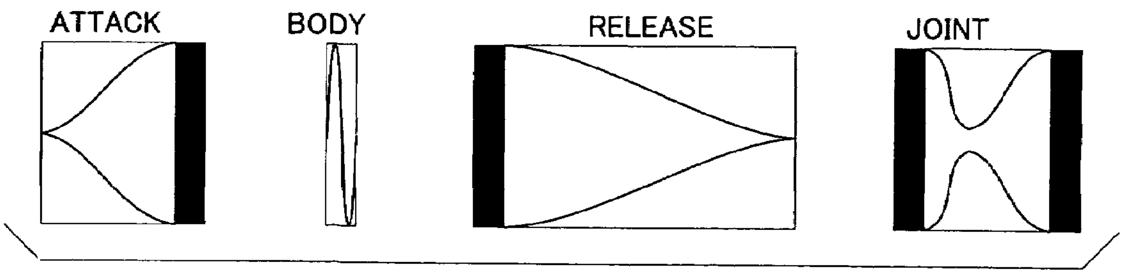
FIG. 2 is a conceptual diagram explanatory of rendition style modules corresponding to various portions of tones.

Now, a description will be made about rendition style modules that are stored in any of the ROM 2, RAM 3 and/or external storage device 4 and used to generate tones corresponding to rendition styles (or articulation) peculiar to various musical instruments. FIG. 2 is a conceptual diagram explanatory of rendition style modules corresponding to various portions of tones.

In the ROM 2, external storage device 4 and/or the like, there is provided a "rendition style waveform database" storing a variety of rendition style modules, which include a multiplicity of original rendition style waveform data sets and related data groups for reproducing waveforms corresponding to various rendition styles. Note that each of the "rendition style modules" is a rendition style waveform unit that can be processed as a single data block in a rendition style waveform synthesis system; in other words, each of the "rendition style modules" is a rendition style waveform unit that can be processed as a single event. Broadly classified, the various rendition style modules, as seen from FIG. 2, include, in correspondence with timewise sections or portions etc., attack-related, body-related, release-related rendition style modules, etc. defining waveform data of individual portions, such as attack, body and release portions, of tones, as well as joint-related rendition style modules defining waveform data of joint portions like connections between tones by slur rendition styles and the like.

In the instant embodiment, the rendition style modules can be further classified into several types on the basis of characteristics of rendition styles, rather than on the basis of the above-mentioned portions of performance tones. For example, the following are seven major types of rendition style modules thus classified in the instant embodiment on the basis of characteristics of rendition styles.

1) "Bendup Attack": This is an attack-related rendition style module representative of (and hence applicable to) a rise portion (i.e., attack portion) of a tone from a silent state, which causes a bendup immediately after the rise of the tone. Here, the bendup is a bend where a pitch lower than a note written on a musical score is quickly returned to the pitch of the written note.

2) "Glissup Attack": This is an attack-related rendition style module representative of (and hence applicable to) a rise portion (i.e., attack portion) of a tone from a silent state, which causes a glissup immediately after the rise of the tone. Here, the glissup is a glissando with a rising pitch.

3) "Vibrato Body": This is a body-related rendition style module representative of (and hence applicable to) a vibrato-imparted portion of a tone in between the rise and fall portions (i.e., vibrato-imparted body portion of the tone).

4) "Benddown Release": This is a release-related rendition style module representative of (and hence applicable to) a fall portion (i.e., release portion) of a tone from a silent state, which causes a benddown immediately before the fall of the tone. Here, the benddown is a bend where a note written on a musical score is quickly shifted to a pitch lower than the note on the musical score.

5) "Glissdown Release": This is a release-related rendition style module representative of (and hence applicable to) a fall portion (i.e., release portion) of a tone from a silent state, which causes a benddown immediately after the fall of the tone. Here, the glissdown is a glissando with a falling pitch.

6) "Gliss Joint": This is a joint-related rendition style module representative of (and hence applicable to) a joint portion which interconnects two tones with no intervening silent state while effecting a glissup or glissdown.

7) "Bend Joint": This is a joint-related rendition style module representative of (and hence applicable to) a joint portion which interconnects two tones with no intervening silent state while effecting a bendup or benddown.

It should be appreciated here that the classification into the above seven rendition style module types is just illustrative, and the classification of the rendition style modules may of course be made in any other suitable manner; for example, the rendition style modules may be classified into more than seven types. Further, needless to say, the rendition style modules may also be classified according to original tone sources, such as musical instruments.

Further, in the instant embodiment, each set of waveform data corresponding to one rendition style module is stored in the database as a data set of a plurality of waveform-constituting factors or elements, rather than being stored directly as the waveform data; each of the waveform-constituting elements will hereinafter be called a "vector". As an example, each rendition style module may include the following vectors. Note that "harmonic" and "nonharmonic" components are defined here by separating an original rendition style waveform in question into a waveform segment having a pitch-harmonious component ("harmonic component") and the remaining waveform segment having a non-pitch-harmonious component ("nonharmonic component") .

1) Waveform shape (timbre) vector of the harmonic component: This vector represents only a characteristic of a waveform shape extracted from among the various waveform-constituting elements of the harmonic component and normalized in pitch and amplitude.

2) Amplitude vector of the harmonic component: This vector represents a characteristic of an amplitude envelope extracted from among the waveform-constituting elements of the harmonic component.

3) Pitch vector of the harmonic component: This vector represents a characteristic of a pitch extracted from among the waveform-constituting elements of the harmonic component; for example, it represents a characteristic of timewise pitch fluctuation relative to a given reference pitch.

4) Waveform shape (timbre) vector of the nonharmonic component: This vector represents only a characteristic of a waveform shape (noise-like waveform shape) extracted from among the waveform-constituting elements of the nonharmonic component and normalized in amplitude.

5) Amplitude vector of the nonharmonic component: This vector represents a characteristic of an amplitude envelope extracted from among the waveform-constituting elements of the nonharmonic component.

The rendition style waveform data of the rendition style module may include one or more other types of vectors, such as a time vector indicative of a time-axial progression of the waveform, although not specifically described here.

For synthesis of a tone, waveforms or envelopes corresponding to various constituent elements of a rendition style waveform are constructed along a reproduction time axis of a performance tone by applying appropriate processing to these vector data in accordance with control data and arranging or allotting the thus-processed vector data on or to the time axis and then carrying out a predetermined waveform synthesis processing on the basis of the vector data allotted to the time axis. For example, in order to produce a desired performance tone waveform, i.e. a desired rendition style waveform, exhibiting predetermined ultimate rendition style characteristics, a waveform segment of the harmonic component is produced by imparting a harmonic component's waveform shape vector with a pitch and time variation characteristic thereof corresponding to a harmonic component's pitch vector and an amplitude and time variation characteristic thereof corresponding to a harmonic component's amplitude vector, and a waveform segment of the nonharmonic component is produced by imparting a nonharmonic component's waveform shape vector with an amplitude and time variation characteristic thereof corresponding to a nonharmonic component's amplitude vector. Then, the desired performance tone waveform can be produced by additively synthesizing the thus-produced harmonic component's waveform segment and nonharmonic component's waveform segment. Details of such tone synthesis processing will be given later (see FIG. 10).

Each of the rendition style modules includes rendition style waveform data and rendition style parameters, as noted above. The rendition style parameters are parameters for controlling the time, level etc. of the waveform of the rendition style module in question. The rendition style parameters may include one or more kinds of parameters depending on the nature of the rendition style module. For example, the "Bendup Attack" rendition style module may include different kinds of rendition style parameters, such as an absolute tone pitch at the end of the bendup attack., initial bend depth during the bendup attack, time length from the start to end of the bendup attack, tone volume immediately after the bendup attack and timewise expansion/contraction of a default curve during the bendup attack. These "rendition style parameters" may be prestored in memory, or may be entered by user's input operation. The existing rendition style parameters may be modified via user operation. Further, in a situation where no rendition style parameter is given at the time of reproduction of a rendition style waveform, predetermined standard rendition style parameters may be automatically imparted. Furthermore, suitable parameters may be automatically produced and imparted in the course of processing.

The preceding paragraphs have set forth the case where each rendition style module has all of the waveform-constituting elements (waveform shape, pitch and amplitude) of the harmonic component and all of the waveform-constituting elements (waveform shape and amplitude) of the nonharmonic component, with a view to facilitating understanding of the description. However, the present invention is not so limited, and some rendition style module may have only one of the waveform shape, pitch and amplitude elements of the harmonic component and only one of the waveform shape and amplitude elements of the nonharmonic component. For example, some rendition style module may have only one of the waveform shape, pitch and amplitude elements of the harmonic component and waveform shape and amplitude elements of the nonharmonic component. In such a case, for each of the components, any appropriate rendition style modules can be used in combination.

The following paragraphs describe determination condition list data which are stored in the ROM 2, RAM 3, external storage device 4 or the like and which are used to assign general-purpose switches and sliders to function as rendition style switches and rendition style sliders each operable by the user to designate a desired rendition style. FIGS. 3A–3D are conceptual diagrams showing examples of the determination condition list data. Because some of the operators 6 are assigned as rendition style switches of different rendition style designation conditions in accordance with the determination condition list data, the determination condition list data are illustrated in FIGS. 3A to 3D according to the rendition style designation conditions of the rendition style switches.

First, the determination condition list data illustrated in FIG. 3A are explained, which comprise data indicative of respective numbers of switches to be used (hereinafter "to-be-used switch numbers"), rendition style names to be displayed on display elements (hereinafter "to-be-displayed rendition style names"), combinations input controller numbers and input controller values and combinations of output controller numbers and output controller values. Each of the to-be-used switch numbers is a switch number previously given to one of general-purpose switch operators on the operator unit 6 that is to be assigned as a rendition style switch. Namely, the individual operators on the operator unit 6 are given serial switch numbers starting with, for example, ①, and designating one of the serial switch numbers can assign the corresponding operator as a rendition style switch. Each of the to-be-displayed rendition style names is a rendition style name to be displayed on the display element positioned near the operator assigned as a rendition style switch in accordance with the switch number. Namely, the to-be-displayed rendition style name is data indicative of a rendition style name designatable by the assigned operator. In the illustrated example, the operator of switch number ① is assigned as a rendition style switch for imparting a "slow bendup" attack rendition style, the operator of switch number ② as a rendition style switch for imparting a "glissup" attack rendition style, the operator of switch number ③ as a rendition style switch for imparting a "vibrato" body rendition style, the operator of switch number ④ as a rendition style switch for imparting a "slow benddown" release rendition style and the operator of switch number ⑤ as a rendition style switch for imparting a "deep glissdown" release rendition style, and each of these rendition style names is displayed on the corresponding display element.

Each of the combinations of input controller numbers and controller values is data indicative of a combination of a controller number and controller value that are input, as a control change (i.e., information indicative of a control change) of MIDI information, to a rendition style determination section M1 (to be described later) in response to operation of any one of the rendition style switches. Generally, each control change of MIDI information is expressed as three-byte data, one of the three bytes being data identifying the control change, another one of the three bytes being data indicative of the controller number, the remaining byte being data indicative of the controller value. Predetermined unique controller numbers are previously assigned to an attack-related controller for controlling attack-related rendition styles, body-related controller for controlling body-related rendition styles, joint-related controller for controlling joint-related rendition styles. In the illustrated example, controller number "0×10" is assigned to the attack-related controller, controller number "0×11" assigned to the body-related controller, controller number "0×12" assigned to the release-related controller, and controller number "0×13" assigned to the joint-related controller. Output control value of each of the controllers is rewritten into an input controller value in accordance with an input controller number determined in response to ON operation (activation or turning-on) of the corresponding rendition style switch. When OFF operation (deactivation or turning-off) is performed, the output control value of the corresponding controller is rewritten into "0×00". Note that the rendition style switches for imparting rendition styles of a same attribute (attack attribute, body attribute, release attribute or joint attribute) are constructed to output different input controller values in response to a same input controller number. In this way, the latest controller value can always be set for each of the controller numbers in response to ON/OFF operation of the corresponding rendition style switch, so that the instant embodiment can readily achieve a so-called "priority-to-last-operation" principle regarding user operation of the rendition style switches.

Each of the combinations of output controller numbers and output controller values, on the other hand, is data indicative of a combination of a controller number and controller value to be output to a tone synthesis section G (to be later described) in correspondence with a control change input to the rendition style determination section M1 in response to operation of any one of the rendition style switches. Rendition style to be imparted is designated in accordance with such a combination of an output controller number and controller value. Namely, the combinations of output controller numbers and controller values correspond to rendition style modules stored in the rendition style waveform database. For example, a combination of values "0×20" and "0×01" corresponds to a rendition style module to provide a "slow bendup" attack rendition style, and a combination of values "0×22" and "0×03" corresponds to a rendition style module to provide a "deep glissdown" release rendition style. Note that the "slow bendup" attack rendition style can be provided using a "bendup" rendition style module and additionally using, as a speed parameter, a value meaning "slow", instead of using the "slow bendup" attack rendition style. Note that, in the instant embodiment, there is no rendition style module corresponding to output controller value "0×00". Namely, if the output controller value is "0×00", it means that there is no rendition style module to be imparted; in such a case, a default rendition style module stored in the rendition style determination section M1 is used.

The determination condition list data illustrated in FIG. 3B are data indicative of validity conditions in addition to the to-be-used switch numbers, to-be-displayed rendition style names, combinations of input controller numbers and controller values and combinations of output controller numbers and controller values. Each of the validity conditions defines a performance state where a rendition style designated by operation of a corresponding rendition style switch is made valid to be reflected in a tone performance; in the instant embodiment, the validity conditions define upper and lower limits of an absolute value of a tone pitch difference or pitch interval between a pitch of a first tone in a slur performance and a pitch of the following or second tone. Namely, for the operator of switch number ⑥ assigned as a rendition style switch for imparting a "gliss joint" rendition style, the validity condition for imparting the "gliss joint" rendition style is that the pitch interval between two tones to be performed with a slur rendition style is 12 half steps (semitones), i.e. that the two tones are away from each other by 12 half steps (one octave). For the operator of switch number ⑦ assigned as a rendition style switch for imparting a "bend joint" rendition style, the validity condition for imparting the "bend joint" rendition style is that the pitch interval between two tones to be performed with a slur rendition style is in a range of one half step to three half steps. Two or more such validity conditions may be defined for each predetermined one of the rendition style switches. For example, for the operator of switch number ⑥ assigned as a rendition style switch for imparting a "special joint", rendition style, the validity condition for imparting the "special joint" rendition style is either that two tones to be performed with a slur rendition style is away from each other by 12 half steps (one octave), or that the two tones are away from each other by any one of pitch intervals in a range of one to three half steps. However, the rendition style to be imparted in this case is either the "gliss joint" rendition style or the "bend joint" rendition style, depending on the validity condition. Note that the terms "slur" rendition style as used in relation to the instant embodiment means a rendition style where a note-on event of a given tone is generated without a note-off event of the preceding tone being generated.

The determination condition list data illustrated in FIG. 3C are data indicative of the to-be-used switch numbers, to-be-displayed rendition style names, combinations of input controller numbers and controller values and combinations of output controller numbers and controller values. The determination condition list data illustrated in FIG. 3C are different from those illustrated in FIG. 3A in that each of the determination condition list data of FIG. 3C defines a plurality of combinations of output controller numbers and controller values in response to one input. The instant embodiment includes, in addition to the above-described controllers, a rendition-style-set controller for collectively controlling a plurality of (i.e., a set of) rendition styles, and controller number "0×14" is assigned to the rendition-style-set controller. Activating a predetermined one of the rendition style switches assigned on the basis of the determination condition list data can designate rendition styles of a plurality of tone portions in a collective fashion. Namely, a combination of rendition styles for the whole of a given tone can be designated by only one rendition style switch operation. For example, once the operator of switch number ⑧ assigned as a rendition style switch for imparting a "bend gliss" rendition style, there can be determined, as the "bend gliss" rendition style, a combination of rendition styles for the whole of a given tone, i.e. a "slow bendup" attack rendition style for the attack portion of the tone and a "deep glissdown" for the release portion of the tone; however, for the body portion of the tone, the output controller value is "0×00", which means that there is no rendition style module to be imparted, so that no particular rendition style is imparted and a default rendition style module is used.

Further, the determination condition list data illustrated in FIG. 3D are data indicative of rendition style slider inputs in addition to the to-be-used switch numbers, to-be-displayed rendition style names, combinations of input controller numbers and controller values and combinations of output controller numbers and controller values. Each of the rendition style slider inputs comprises a controller number and controller value input, as a control change, to the rendition style determination section M1 in response to operation of any one of the rendition style sliders. Controller numbers (e.g., "0×50"–"033 59") are assigned in advance to the rendition style sliders. In response to operation of any one of the rendition style sliders, a given controller number and a controller value (e.g., "0×00"–"0×7F") corresponding to an operated amount of the rendition style slider are input to the rendition style determination section M1. The rendition style slider input controller values in the determination condition list data each include upper and lower limit values corresponding to an operated amount of the rendition style slider, and the output controller numbers and controller values are defined so as to correspond to the input controller values. For example, for the operator of switch number ① assigned as a rendition style switch for imparting a "bendup" rendition style, an performance condition for imparting the "bendup" rendition style is either that the input controller value of the rendition style slider is in a range of "0×00"–"0×3F" or in a range of "0×40"–"0×7F", and a different form of "bendup" rendition style is imparted depending on the input controller value. Namely, the rendition style to be imparted varies in accordance with the operated amount of the rendition style slider.

Each of the rendition style switches assigned on the basis of the above-mentioned determination condition list data designates an attribute and rendition style in response to ON operation or activation thereof. Here, the "attribute" represents one of an attack portion that is a beginning section of a tone, a body portion that is a sustain section of a tone, a release portion that is an ending section of a tone and a joint portion interconnecting two successive tones. In a performance, the user can determine a rendition style of a tone to be performed, by depressing a corresponding one of the rendition style switches simultaneously with a corresponding performance operator. At that time, activating a rendition switch for imparting a rendition style of a given attribute can automatically determine a particular portion of a tone to which the rendition style is to be applied. Timing to determine a rendition style differs per attribute, and the latest input controller value is used at timing when the rendition style in question is to be imparted. As any one of the rendition style switches is depressed, an attribute and rendition style setting value are output as MIDI information (namely, input controller number and input controller value), while, as the rendition style switch is released, an attribute and rendition style resetting value are output as MIDI information (namely, input controller value and input controller value "0×00"). Thus, only when the user is actually depressing the any one of the rendition style switches, he or she can determine a rendition style independently for each of tone portions.

Figure 4:
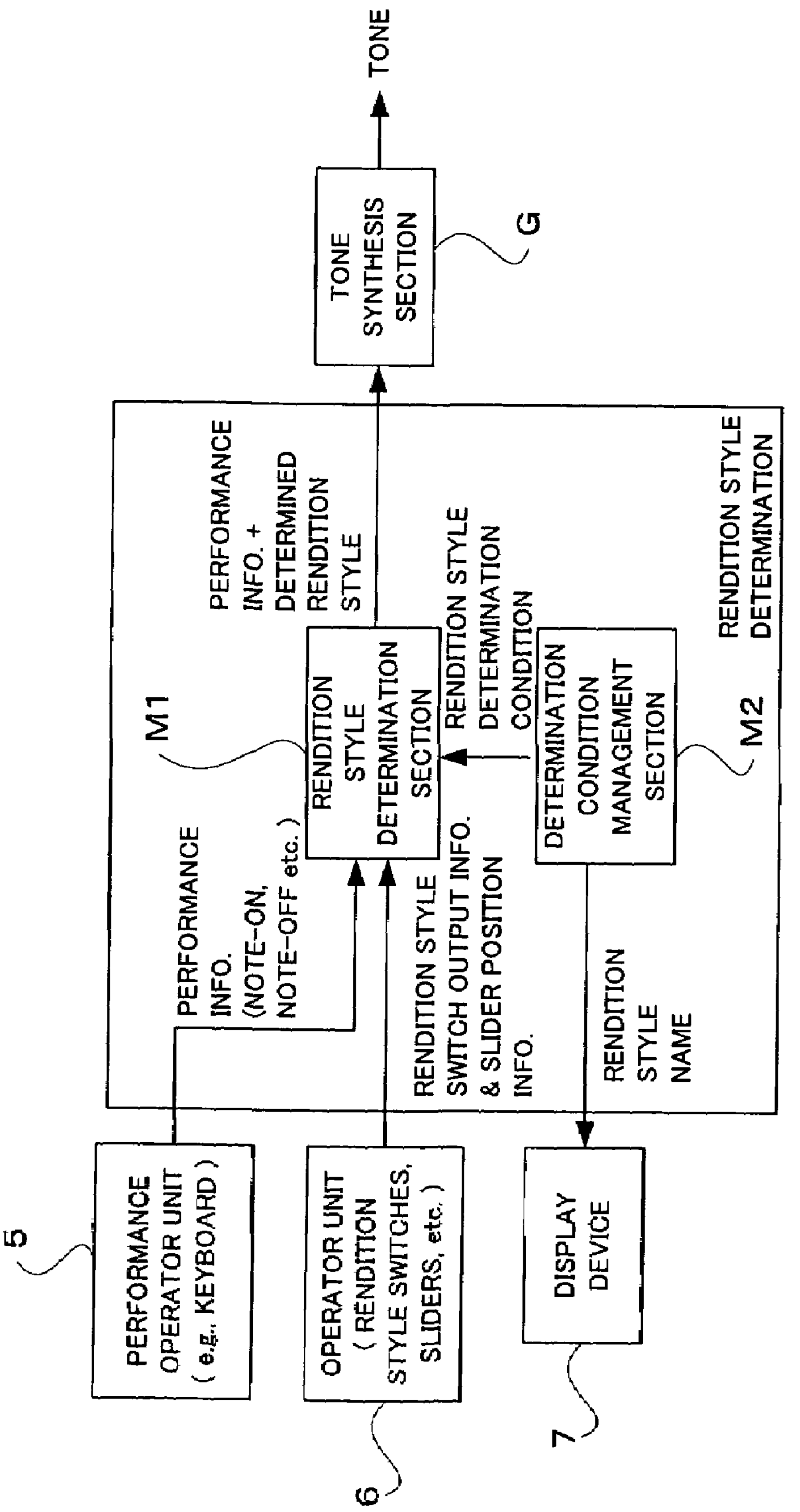
FIG. 4 is a block diagram explanatory of an outline of processing performed by the electronic musical instrument.

Next, processing performed by the electronic musical instrument of FIG. 1 will be outlined with reference to FIG. 4. FIG. 4 is a block diagram explanatory of the outline of the processing performed by the electronic musical instrument, where arrows represent flows of various data.

For example, once voice data is selected via the tone synthesis section G as a tone color with which a tone is to be generated, a determination condition management section M2 reads out, in accordance with a musical instrument type represented by the selected voice data, determination condition list data corresponding to the musical instrument type from the ROM 2, external storage device 4 or the like. Then, the determination condition management section M2 allocates an input controller number and input controller value to any one of the general-purpose operators of the operator unit 6 on the basis of a to-be-used switch number indicated by the read-out determination condition list data, and assigns the general-purpose operator (for purposes of convenience, denoted by reference numeral 6) as a rendition style switch. Also, the determination condition management section M2 assigns any one of the general-purpose sliders as a rendition style slider. Then, on the basis of a to-be-displayed rendition style name indicated by the read-out determination condition list data, the determination condition management section M2 loads a rendition style name to the corresponding display element 7 disposed near the general-purpose operator 6 assigned as a rendition style switch. In this way, the loaded rendition style name is displayed on the corresponding display element 7, and the general-purpose operator 6 is set to function as a dedicated rendition style imparting switch, namely, rendition style switch or rendition style slider.

The performance operator unit 5 outputs, in response to user's operation thereof, performance information, such as note-on and note-off event data and other controller signals, to the rendition style determination section M1. Each user-operated rendition style switch outputs rendition style switch output information identifying the rendition style switch and indicating that the rendition style switch has been depressed or released, and each user-operated rendition style slider outputs slider position information identifying the rendition style slider and indicating an operated amount of the slider. Such performance information output from the performance operator unit 5, rendition style switch output information output from the rendition style switch and slider position information output from the rendition style slider is supplied to the rendition style determination section M1 as MIDI information, such as a note-on/note-off and control change data (input controller number and input controller value). Then, the rendition style determination section M1 determines a rendition style on the basis of the individual supplied information and outputs, to the tone synthesis section G, the performance information from the performance operator unit 5 with the thus-determined rendition style imparted thereto.

Specifically, on the basis of determination condition list data read out by the determination condition management section M2, the rendition style determination section M1 outputs an output controller number and output controller value corresponding to the control change (input controller number and input controller value) supplied from the rendition style switch and rendition style slider. The tone synthesis section G performs tone synthesis, on the basis of the performance information output from the rendition style determination section M1 in response to user's operation on the performance operator unit 5 and the rendition style (i.e., output controller number and output controller value of the control change) determined by the rendition style determination section M1 in accordance with the determination condition list data. In this way, the tone synthesis section G synthesizes a tone waveform imparted with the rendition style, to output a tone with the rendition style. Namely, the performance operator unit 5 synthesizes a tone waveform by reading out a rendition style module corresponding to the output controller number and output controller value of the control change supplied from the rendition style determination section M1. Details will be given later about the rendition style determination processing executed by the rendition style determination section M1 and the tone synthesis processing executed by the tone synthesis section G.

As a modification, the performance operator unit 5, operator unit 6, display device 7, rendition style determination section M1 and determination condition management section M2 may be integrated into single performance equipment. In this case, a rendition style determined by the performance equipment is assigned to control change data of MIDI information and supplied to the tone synthesis section G that is a tone generator. In an alternative, the above-mentioned components may be constructed as a few pieces of equipment, for example, the performance operator unit 5 as first MIDI equipment, the operator unit 6 and display device 7 as second MIDI equipment and the rendition style determination section M1 and determination condition management section M2 as tone generator equipment. In this alternative, MIDI information from the first and second MIDI equipment is supplied to the tone generator equipment. It should also be obvious that the rendition style determination section M1, performing a rendition style determination responsive to user's operation of any one of the rendition style switches, may be constructed as a component independent of the tone generator rather than as a part of the tone generator.

In the electronic musical instrument of FIG. 1, both the processing for determining a rendition style to be imparted in response to user's operation of any one of the rendition style switches and the processing for synthesizing a tone waveform imparted with the determined rendition style is performed by a computer executing predetermined software programs etc. directed to the rendition style determination processing and tone synthesis processing of the instant embodiment. Needless to say, both of such rendition style determination processing and tone synthesis processing may be implemented by a dedicated hardware apparatus instead of such software programs.

First, the rendition style determination processing is described below. Because the rendition style determination processing differs in contents depending on the nature of a rendition style switch assigned in accordance with contents of read-out determination condition list data, the rendition style determination processing will be described using separate figures corresponding to different contents of the determination condition list data. FIGS. 5–8 are flow charts showing several examples of the rendition style determination processing.

Figure 5:
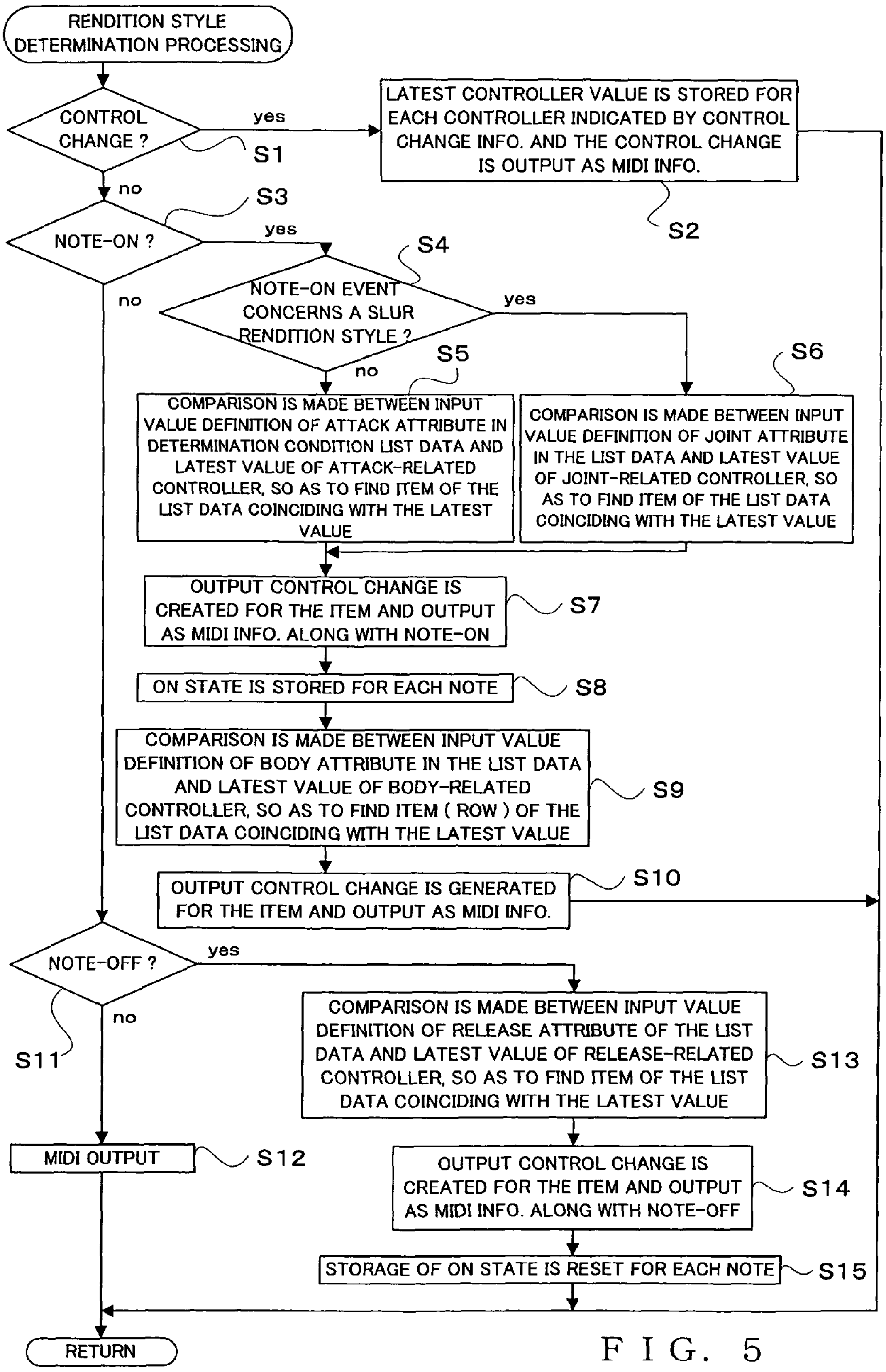
FIG. 5 is a flow chart showing an example of rendition style determination processing carried out in the electronic musical instrument when any one of rendition style switches assigned in accordance with the determination condition list data illustrated in FIG. 3A is operated.

FIG. 5 is an example of the rendition style determination processing carried out when any one of the rendition style switches assigned in accordance with the determination condition list data illustrated in FIG. 3A is operated.

Figure 9:
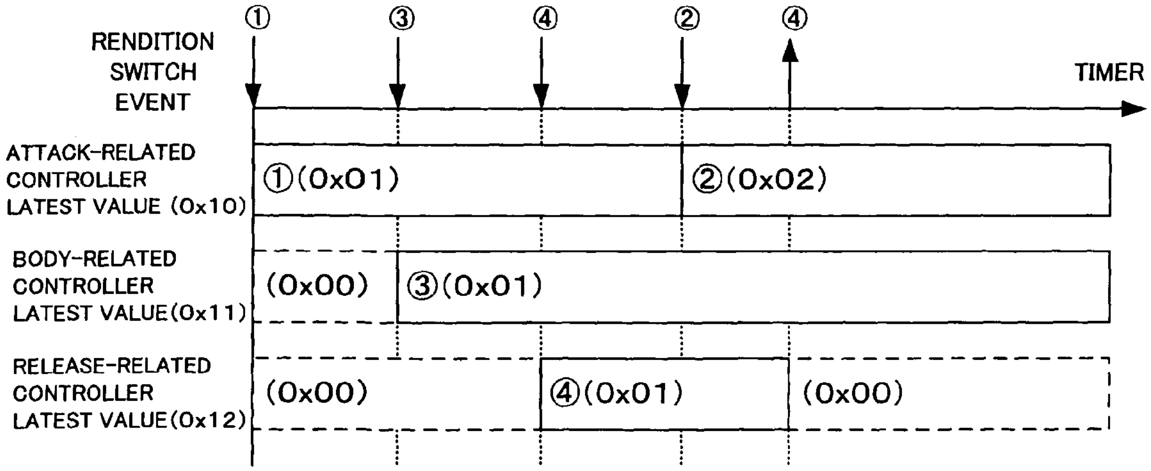
FIG. 9 is a conceptual diagram explanatory of variation in the latest value stored per controller in response to user's rendition style switch operation.

At step S1, a determination is made as to whether or not received MIDI information represents a control change. If the received MIDI information represents a control change (YES determination at step S1), the latest controller value is stored for each controller indicated by the control change information and the control change is output as MIDI information (in the MIDI format), at step S2. For example, if the input controller numbers in the received control change are "0×10", "0×11" and "0×12", it means that the received MIDI information is based on user's rendition style switch operation, the input controller values in the received control change are set as the latest values of attack-, body- and release-related controllers, as illustratively shown in FIG. 9. FIG. 9 is a conceptual diagram explanatory of variation in the latest value stored per controller in response to user's rendition style switch operation. Specifically, FIG. 9 illustrates various operation sequentially performed over time by the user, such as depression of the operator of to-be-used switch number ① assigned as a rendition style switch (hereinafter referred to simply as "rendition style switch ①"), depression of the operator of to-be-used switch number ③ assigned as a rendition style switch (hereinafter referred to simply as "rendition style switch ③"), depression of the operator of to-be-used switch number ④ assigned as a rendition style switch (hereinafter referred to simply as "rendition style switch ④"), depression of the operator of to-be-used switch number ② assigned as a rendition style switch (hereinafter referred to simply as "rendition style switch ②") and release of rendition style switch ④.

Once rendition style switch ① is depressed (i.e., turned on), there is output a control change that indicates controller number "0×10" and controller value "0×01" having been set in advance in accordance with the determination condition list data, in response to which the latest value of the attack-related controller of controller value "0×10" is renewed from "0×00" to "0×01". Then, once rendition style switch ③ is depressed with rendition style switch ① kept depressed, the latest value of the body-related controller of controller value "0×11", having been set in advance in accordance with the determination condition list data, is renewed from "0×00" to "0×01". Then, once rendition style switch ④ is depressed, the latest value of the release-related controller of controller value "0×12", having been set in advance in accordance with the determination condition list data, is renewed from "0×00" to "0×01". Further, once rendition style switch ② is depressed, the latest value of the attack-related controller of controller value "0×10", having been set in advance in accordance with the determination condition list data, is renewed from "0×01" to "0×02". Then, once only rendition style switch ④ is released (i.e., turned off), the latest value of the release-related controller of controller value "0×12", having been set in advance in accordance with the determination condition list data, is renewed from "0×01" to "0×00". Namely, the "priority-to-last-operation is achieved by defining the determination condition list data of a same attribute to output a same input controller number and different input controller values and updating, in response to each operation of any one of the rendition style switches, the latest value of each controller with the input controller value.

Whereas the instant embodiment has been described in relation to the case where the latest value of the attack-related controller is updated to "0×00" when, for example, rendition style switch ① and rendition style switch ② of a same attack attribute are depressed in succession in the order named and then rendition style switch ② is released, the present invention is not necessarily so limited. For example, there may be stored a history of every depressed rendition style switches so that the input controller value of rendition style switch ① is output in response to release of rendition style switch ②. Such processing can be readily implemented by storing a history of depression operation of the rendition style switches for each of the attributes.

Referring back to the flow chart of FIG. 5, if the received MIDI information does not represent a control change (NO determination of step S1), it is further determined at step S3 whether or not the received MIDI information represents a note-on event. If the received MIDI information represents a note-on event (YES determination at step S3), a further determination is made at step S4 as to whether or not the note-on event concerns a slur rendition style, i.e. whether there is another note having been already subjected to a note-on process. If the note-on event does not concern a slur rendition style, i.e. whether there is no other note having been already subjected to a note-on process (NO determination at step S4), a comparison is made between the input value definition of the attack attribute in the determination condition list data and the latest value of the attack-related controller, so as to find an item (row) of the determination condition list data coinciding with the latest value (step S5). If the note-on event concerns a slur rendition style, i.e. there is another note having been already subjected to a note-on process, (YES determination at step S4), a comparison is made between the input value definition of the joint attribute in the determination condition list data and the latest value of the joint-related controller, so as to find an item (row) of the determination condition list data coinciding with the latest value (step S6). Then, an output control change is generated for the found item and output as MIDI information, at step S7. At next step S8, an ON state is stored for each of the notes. Then, at step S9, a comparison is made between the input value definition of the body attribute in the determination condition list data and the latest value of the body-related controller, so as to find an item (row) of the determination condition list data coinciding with the latest value. Then, an output control change is generated for the item and output as MIDI information, at step S10. Then, the rendition style determination processing is brought to an end.

When any one of the rendition style switches has been depressed, the latest values of the individual controllers are updated in accordance with the priority-to-last-operation principle, as having been set forth above. Thus, in the instant embodiment, the rendition style determination processing determines a rendition style by detecting, at timing determined separately per attribute such as note-on or note-off timing, determination condition list data in which the input controller number and input controller value coincide with the latest value of each of the controllers and then outputting an output controller number and output controller value of the detected data as output control change MIDI information. For example, when rendition style switch ① has been depressed, the latest value of the attack-related controller (controller number "0×10") is updated or renewed to "0×01". In this state, once note-on event data that does not concern a slur rendition style is received, a search is made through all of the determination condition list data of FIG. 3A to find an item of the determination condition list data that represents input controller number "0×10" and input controller value "0×01", and output controller number "0×20" and output controller value "0×01" of the found data are output as output control change MIDI information. In this way, upon receipt of note-on event data, the rendition style determination processing determines rendition styles for an attack or joint portion and body portion. Namely, the rendition style determination processing determines a rendition style of the attack attribute by checking the latest values of the rendition style switch and rendition style slider at the note-on timing, and determines a rendition style of the body attribute by checking the latest values of the rendition style switch and rendition style slider at the note-on timing. Further, the rendition style determination processing determines a rendition style of the joint attribute by checking the latest values of the rendition style switch and rendition style slider at the note-on timing of a note immediately following input of a slur rendition style (where the note-on event data of the succeeding tone is input before occurrence of the note-off event of the preceding note).

If the received MIDI information does not represent a note-on event (NO determination at step S3), a further determination is made at step S11 as to whether or not the received MIDI information represents a note-off event. If the received MIDI information does not represent a note-off event (NO determination at step S11), the received MIDI information is output as it is at step S12, after which the current processing is brought to an end. If, on the other hand, the received MIDI information represents a note-off event (YES determination at step S11), a comparison is made between the input value definition of the release attribute of the determination condition list data and the latest value of the release-related controller, so as to find an item of the determination condition list data coinciding with the latest value (at step S13). Then, output control change MIDI information is created for the found item and output along with note-off event data, at step S14. Then, storage of the ON state is reset for each of the notes at step S15, and the rendition style determination processing is brought to an end. Namely, when note-off event data has been received, the rendition style determination processing determines a release rendition style. Namely, a rendition style of the release attribute can be determined by checking the latest values of the rendition style switch and rendition style slider at note-off timing.

Figure 6:
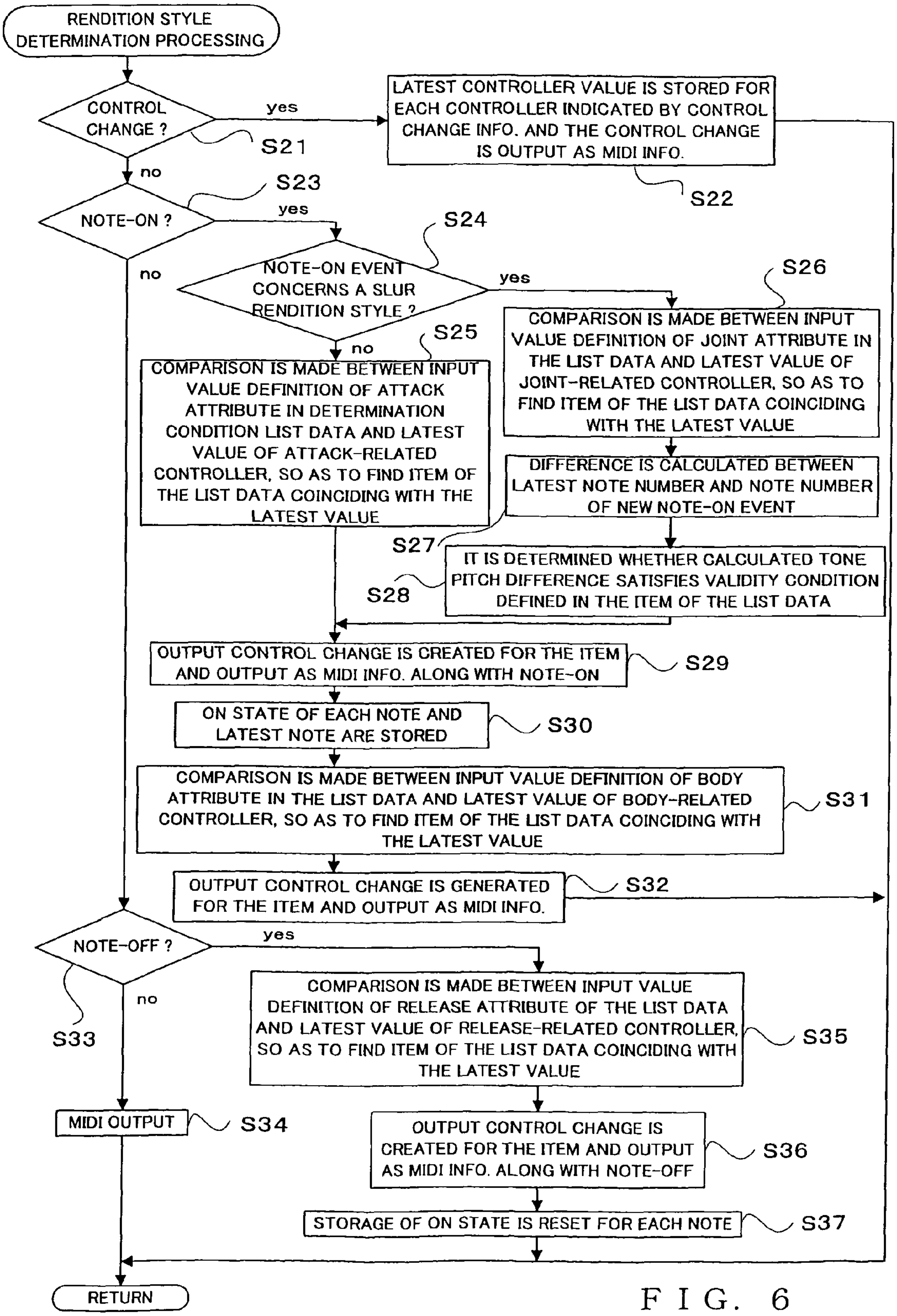
FIG. 6 is a flow chart showing another example of the rendition style determination processing carried out when any one of the rendition style switches assigned in accordance with the determination condition list data illustrated in FIG. 3B is operated.

FIG. 6 is another example of the rendition style determination processing carried out when any one of the rendition style switches assigned in accordance with the determination condition list data illustrated in FIG. 3B is operated.

At step S21, a determination is made as to whether or not received MIDI information represents a control change. If the received MIDI information represents a control change (YES determination at step S21), the latest controller value is stored for each controller indicated by the control change information and the control change is output as MIDI information, at step S22. If the received MIDI information represents a note-on event (YES determination at step S23) and concerns a slur rendition style (YES determination at step S24), a comparison is made between the input value definition of the joint attribute of the determination condition list data and the latest value of the release-related controller, so as to find an item of the determination condition list data coinciding with the latest value of the release-related controller (step S26). At next step S27, a difference is calculated between the latest note number and the note number of the new note-on event. Namely, because the determination condition list data illustrated in FIG. 3B include validity conditions about tone pitch differences (pitch intervals) and a rendition style to be imparted is determined in accordance with the validity condition, a tone pitch difference is calculated between the notes. Then, at step S28, it is determined whether or not the calculated tone pitch difference satisfies the validity condition defined in the found item of the determination condition list data. At next step S29, an output control change is created for the found item and output as MIDI information along with note-on event data. At following step S30, an ON state of each of the notes and the latest note are stored. Then at step S31, a comparison is made between the input value definition of the body attribute of the determination condition list data and the latest value of the body-related controller, to find an item of the determination condition list data coinciding with the latest value of the body-related controller. At next step S32, an output control change is created for the coincided item and output as MIDI information. If the received MIDI information does not represent a note-on event (NO determination at step S23), the processing goes to steps S33–S37. These steps S33–S37 are directed to operations similar to the above-described operations of steps S11–S15 of FIG. 5 and therefore will not be described to avoid unnecessary duplication.

Figure 7:
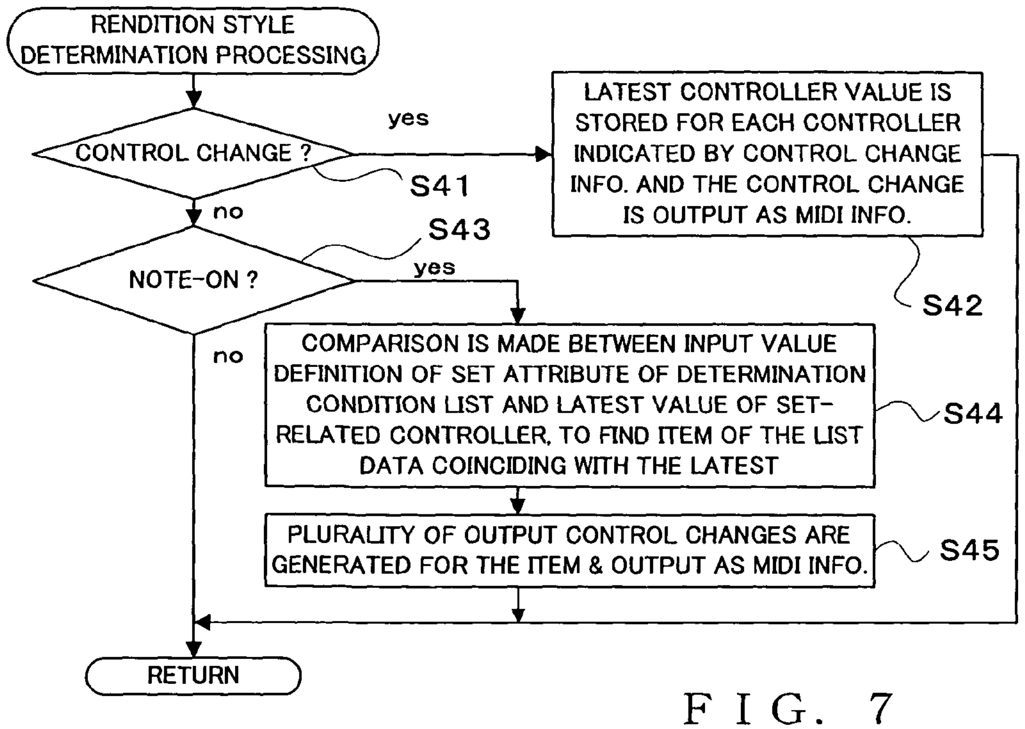
FIG. 7 is a flow chart showing still another example of the rendition style determination processing carried out when any one of the rendition style switches assigned in accordance with the determination condition list data illustrated in FIG. 3C is operated.

FIG. 7 is an example of the rendition style determination processing carried out when any one of the rendition style switches assigned in accordance with the determination condition list data illustrated in FIG. 3C.

At step S41, a determination is made as to whether or not received MIDI information represents a control change. If the received MIDI information represents a control change (YES determination at step S41), the latest controller value is stored for each controller indicated by the control change information and the control change is output as MIDI information, at step S42. If the received MIDI information does not represent a control change (NO determination at step S41), it is further determined at step S43 whether or not the received MIDI information represents a note-on event. If the received MIDI information represents a note-on event (YES determination at step S43), a comparison is made between the input value definition of the set attribute of the determination condition list and the latest value of the set-related controller, to find an item of the determination condition list data coinciding with the latest value of the set-related controller (step S44). At next step S45, a plurality of output control changes are created for the found item and output as MIDI information. Namely, when a rendition style set has been designated, the processing checks the latest values of the rendition style switch and rendition style slider, so that rendition styles for attack, body and release portions can be determined collectively at the same time.

Figure 8:
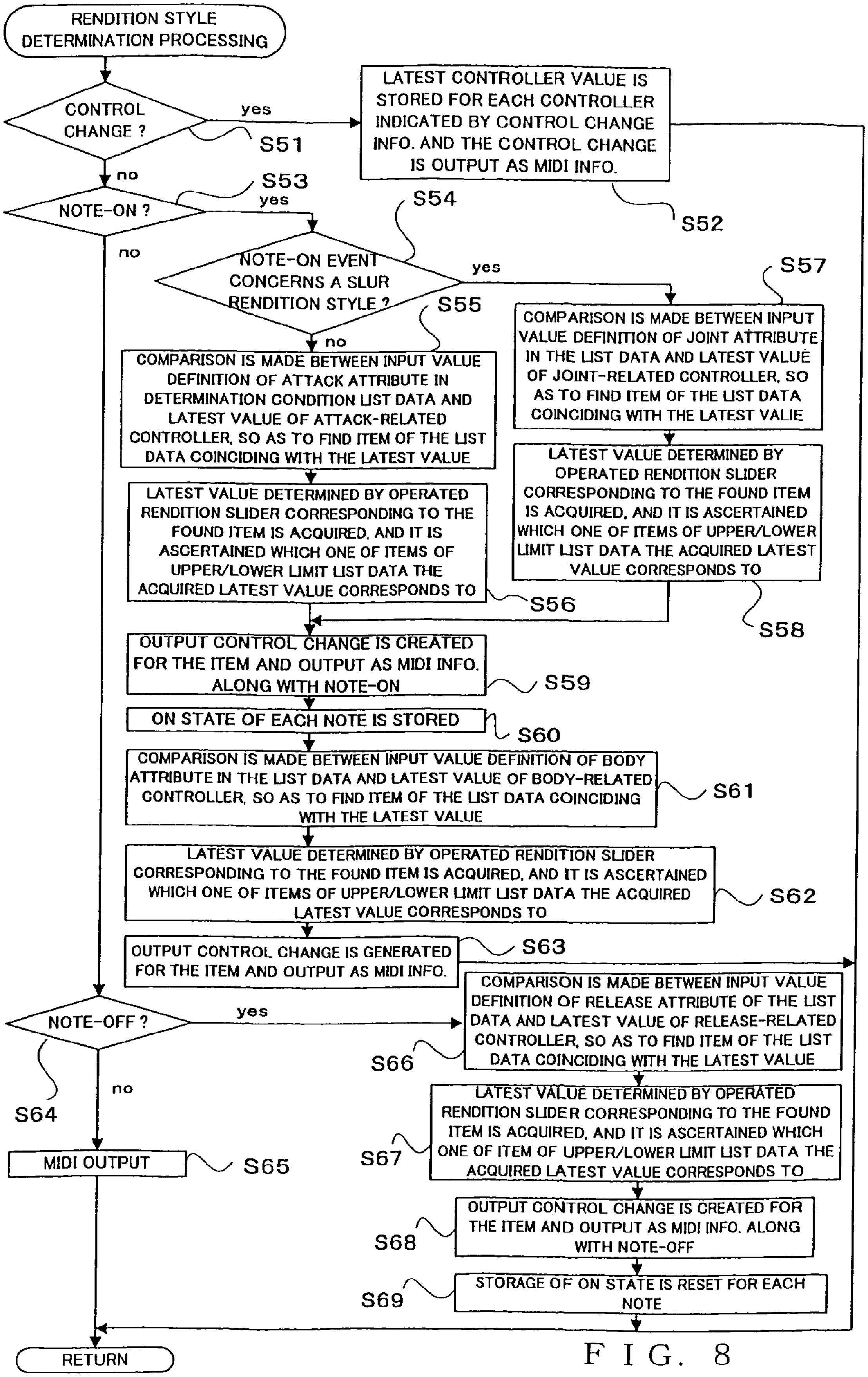
FIG. 8 is a flow chart showing still another example of the rendition style determination processing carried out when any one of the rendition style switches assigned in accordance with the determination condition list data illustrated in FIG. 3D is operated.

FIG. 8 is an example of the rendition style determination processing carried out when any one of the rendition style switches assigned in accordance with the determination condition list data illustrated in FIG. 3D.

At step S51, a determination is made as to whether or not received MIDI information represents a control change. If the received MIDI information represents a control change (YES determination at step S51), the latest controller value is stored for each controller indicated by the control change information and the control change is output as MIDI information, at step S52. If the received MIDI information does not represent a control change (NO determination at step S51), it is further determined at step S53 whether or not the received MIDI information represents a note-on event. If the received MIDI information represents a note-on event (YES determination at step S53), it is further determined at step S54 whether the note-on event concerns a slur rendition style. If the note-on event does not concern a slur rendition style (NO determination at step S54), a comparison is made between the input value definition of the attack attribute of the determination condition list data and the latest value of the attack-related controller, to find an item of the determination condition list data coinciding with the latest value of the set-related controller (step S55). Then, the latest value determined by an operated amount of the operated rendition slider corresponding to the found item is acquired, and it is ascertained which one of items of the upper/lower limit list data in the determination condition list data the acquired latest value corresponds to (step S56). If, on the other hand, the note-on event concerns a slur rendition style (YES determination at step S54), a comparison is made between the input value definition of the joint attribute of the determination condition list data and the latest value of the joint-related controller, to find an item of the determination condition list data coinciding with the latest value of the joint-related controller (step S57). Then, the latest value determined by an operated amount of the operated rendition slider corresponding to the found item is acquired, and it is ascertained which one of items of the upper/lower limit list data in the determination condition list data the acquired latest value corresponds to (step S58).

At following step S59, an output control change is created for the found item and output as MIDI information along with note-on event data. At following step S60, an ON state of each of the notes is stored. Then at step S61, a comparison is made between the input value definition of the body attribute of the determination condition list data and the latest value of the body-related controller, to find an item of the determination condition list data coinciding with the latest value of the body-related controller. At next step S62, the latest value determined by an operated amount of the operated rendition slider corresponding to the found item is acquired, and it is ascertained which of items of the upper/lower limit list data in the determination condition list data the acquired latest value corresponds to. At following step S63, an output control change is created for the coincided item and output as MIDI information, after which the rendition style determination processing is brought to an end. If the received MIDI information does not represent a note-on event (NO determination at step S53), a further determination is made at step S64 as to whether or not the received MIDI information represents a note-off event. If the received MIDI information does not represent a note-off event (NO determination at step S64), the received MIDI information is output as it is, at step S65, and the rendition style determination processing is brought to an end. If, on the other hand, the received MIDI information represents a note-off event (YES determination at step S64), a comparison is made between the input value definition of the release attribute of the determination condition list data and the latest value of the release-related controller, to find an item of the determination condition list data coinciding with the latest value of the release-related controller (step S66). Further, at step S67, the latest value of the latest value determined by an operated amount of the operated rendition slider corresponding to the found item is acquired, and it is ascertained which of items of the upper/lower limit list data in the determination condition list data the acquired latest value corresponds to. Then, an output control change is created for the found item and output as MIDI information, at step S68. Also, storage of the ON state is reset for each of the notes at step S69, and the rendition style determination processing is brought to an end.

Figure 10:
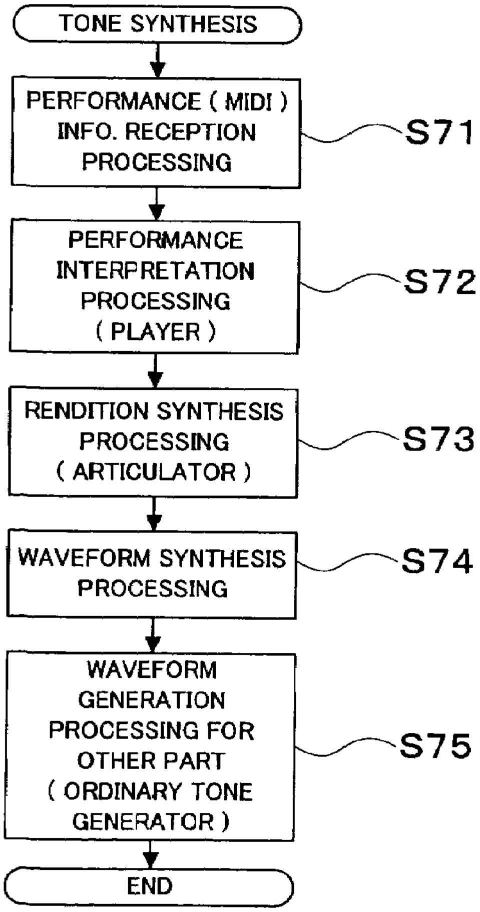
FIG. 10 is a flow chart showing an exemplary step sequence of tone synthesis processing performed in the electronic musical instrument.

Next, a description will be given about the tone synthesis processing for synthesizing an ordinary tone waveform and rendition style waveform, with reference to FIG. 10. FIG. 10 is a flow chart showing an exemplary step sequence of the tone synthesis processing.

At step S71, performance reception processing is carried out to receive MIDI information. At next step S72, performance interpretation processing (player) is carried out. In the performance interpretation processing, the received MIDI information is analyzed to generate rendition style designating information (rendition style IDs and rendition style parameters), and there is output rendition-style-imparted performance information having the thus-generated rendition style designating information imparted thereto. Namely, once MIDI information is received, the performance interpretation processing determines each rendition style, in accordance with control change information included in the received MIDI information, for each performance part and at each of points corresponding to necessary performance points corresponding to the individual rendition styles in a time-serial flow of the received MIDI information; thus, the performance interpretation processing imparts various rendition style modules. At next step S73, rendition style synthesis processing (articulator) is carried out. In the rendition style synthesis processing, reference is made to a rendition style table previously provided in the external storage device 4 or the like on the basis of the rendition style designating information (rendition style IDs and rendition style parameters) included in the rendition-style-imparted performance information generated by the performance interpretation processing, so as to generate a packet stream (also called "vector stream") corresponding to the rendition style designating information (rendition style IDs and rendition style parameters) and vector parameters for the packet stream corresponding to the rendition style parameters. The thus-generated packet stream and vector parameters are supplied to waveform synthesis processing (step S74). Among various data supplied to the waveform synthesis processing in the packet stream are time information, vector IDs, trains of representative point values, etc. of the packet as regards the pitch and amplitude elements, and vector IDs, time information, etc. of the packet as regards the waveform shape (timbre) element. To generate the packet stream, time values at individual positions are calculated in accordance with time information. Namely, individual rendition style modules are placed at or allocated to absolute time positions on the basis of the time information. Specifically, corresponding absolute times are calculated from element data indicative of individual time positions, on the basis of the time information. In this manner, respective timing of the individual rendition style modules is determined. Then, "rehearsal processing" is carried out in order to adjust the individual element data to thereby smooth respective connecting portions of adjacent rendition style modules, i.e. in order to interconnect a pair of preceding and succeeding rendition style modules with the representative points of the respective connecting portions put close to each other to thereby smooth waveform characteristics of the preceding and succeeding rendition style modules.

The "rehearsal processing" is intended to achieve smooth connections in time and level values between the respective start and end points of time-serially-combined waveform constituting elements (in the instant embodiment, waveform shapes, amplitudes and pitches of the harmonic component, and waveform shapes and amplitudes of the nonharmonic component). For this purpose, the rehearsal processing, prior to execution of the actual rendition style synthesis, reads out the vector IDs, trains of representative point values and other parameters by way of a "rehearsal", performs simulative rendition style synthesis on the basis of the thus read-out data and parameters, and thereby sets appropriate parameters for controlling the time and level values at the start and end points of the individual rendition style modules. By performing the rendition style synthesis processing using parameters set on the basis of the "rehearsal processing", the successive rendition style waveforms can be interconnected smoothly, for each of the waveform-constituting elements such as the waveform shape, amplitude and pitch. Namely, instead of adjusting or controlling already-synthesized rendition style waveforms or waveform-constituting elements with a view to achieving smooth connections between the rendition style waveforms or waveform-constituting elements, the "rehearsal processing" in the instant embodiment is performed, immediately before actually synthesizing the rendition style waveforms or waveform-constituting elements, to simulatively synthesize the rendition style waveforms or waveform-constituting elements and thereby set optimal parameters relating to the time and level values at the start and end points of the rendition style modules. Then, actual synthesis of the rendition style waveforms or waveform-constituting elements are carried out using the thus-set optimal parameters, so that the rendition style waveforms or waveform-constituting elements can be connected together smoothly.

At next step S74, the waveform synthesis processing is carried out. In the waveform synthesis processing, vector data are read out from the rendition style waveform database in accordance with the packet stream, the vector data are modified in accordance with the vector parameters, and a waveform is synthesized on the basis of the modified vector data. At following step S75, the waveform synthesis processing is carried out for other performance parts. Here, the "other performance parts" are performance parts to which ordinary tone waveform synthesis processing is applied. For example, for each of the other performance parts, tone generation is performed in accordance with the ordinary waveform memory tone generator scheme. The waveform synthesis processing for the other performance parts may be performed by a dedicated hardware tone generator (external tone generator unit or tone generator card attachable to a computer). To simplify the description, let it be assumed that the instant embodiment performs tone generation in accordance with a designated rendition style (or articulation) on only one performance part.

In the above-described manner, by the user only operating any of the rendition style switches, the tone synthesis processing can readily generate a tone waveform having a combination of suitable rendition styles of individual tone portions. The following paragraphs describe examples of tone waveforms generated in response to operation of the rendition style switches, using separate figures corresponding to different contents of the determination condition list data. FIGS. 11–14 are conceptual diagrams showing envelopes of output tone waveforms. In an upper region of each of FIGS. 11–14, there are illustrated input MIDI information and an output tone waveform when the user or human player has executed performance operation without activating any rendition style switch, while, in a lower region of each of FIGS. 11–14, there are illustrated input MIDI information and an output tone waveform when the user or human player has executed performance operation while activating the rendition style switches.

Figure 11:
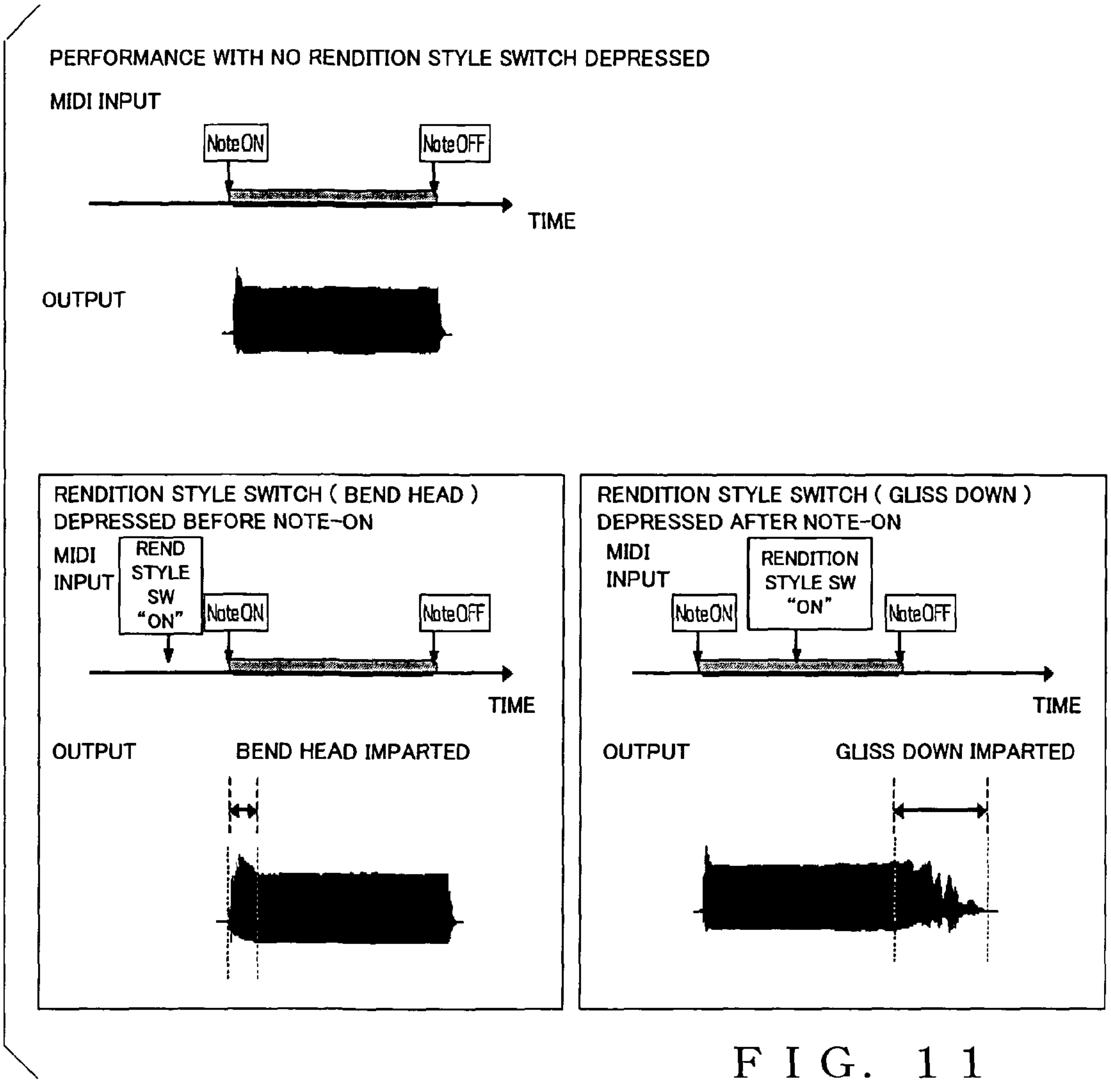
FIG. 11 is a conceptual diagram showing envelopes of output tone waveforms when the rendition style switches assigned in accordance with the determination condition list data illustrated in FIG. 3A are operated.

As seen from FIG. 11, when rendition style switch ① assigned in accordance with the determination condition list data of FIG. 3A has been activated prior to corresponding note-on timing, a tone waveform is generated with a bendup attack rendition style imparted to the attack portion of the tone waveform illustrated in the upper region (see a lower left block of FIG. 11). Namely, when rendition style switch ① has been activated prior to the corresponding note-on timing, an output control change is output at the note-on timing in accordance with the determination condition list data, and a rendition style module corresponding to the output control change is used. When rendition style switch ⑤ assigned in accordance with the determination condition list data of FIG. 3A has been activated prior to note-off timing (including timing before corresponding note-on timing), a tone waveform is generated with a glissdown release rendition style imparted to the release portion of the tone waveform illustrated in the upper region (see a lower right block of FIG. 11). Namely, when rendition style switch ⑤ has been activated prior to the note-off timing, a rendition style module corresponding to an output control change output at the note-off timing in accordance with the determination condition list data is used. Namely, in the case where rendition style switches assigned in accordance with the determination condition list data of FIG. 3A are used, the user can designate a rendition style for each tone portion by operation of any one of the assigned rendition style switches, so that there can be generated a tone waveform having an appropriate combination of the designated rendition styles of the individual tone portions incorporated therein. Further, the user may depress a given rendition style switch (e.g., rendition style switch ⑤) while keeping another rendition style switch (e.g., rendition style switch ①) depressed; by so doing, the user can designate, while keeping one rendition style designated, an additional rendition style that can be applied simultaneously with the one rendition style designated. Further, when two rendition styles are being designated simultaneously for the attack and release portions of a tone waveform as in the above-mentioned example, the user can cancel the designation of either one of the rendition styles by releasing (deactivating or turning off) the corresponding rendition style switch.

Figure 12:
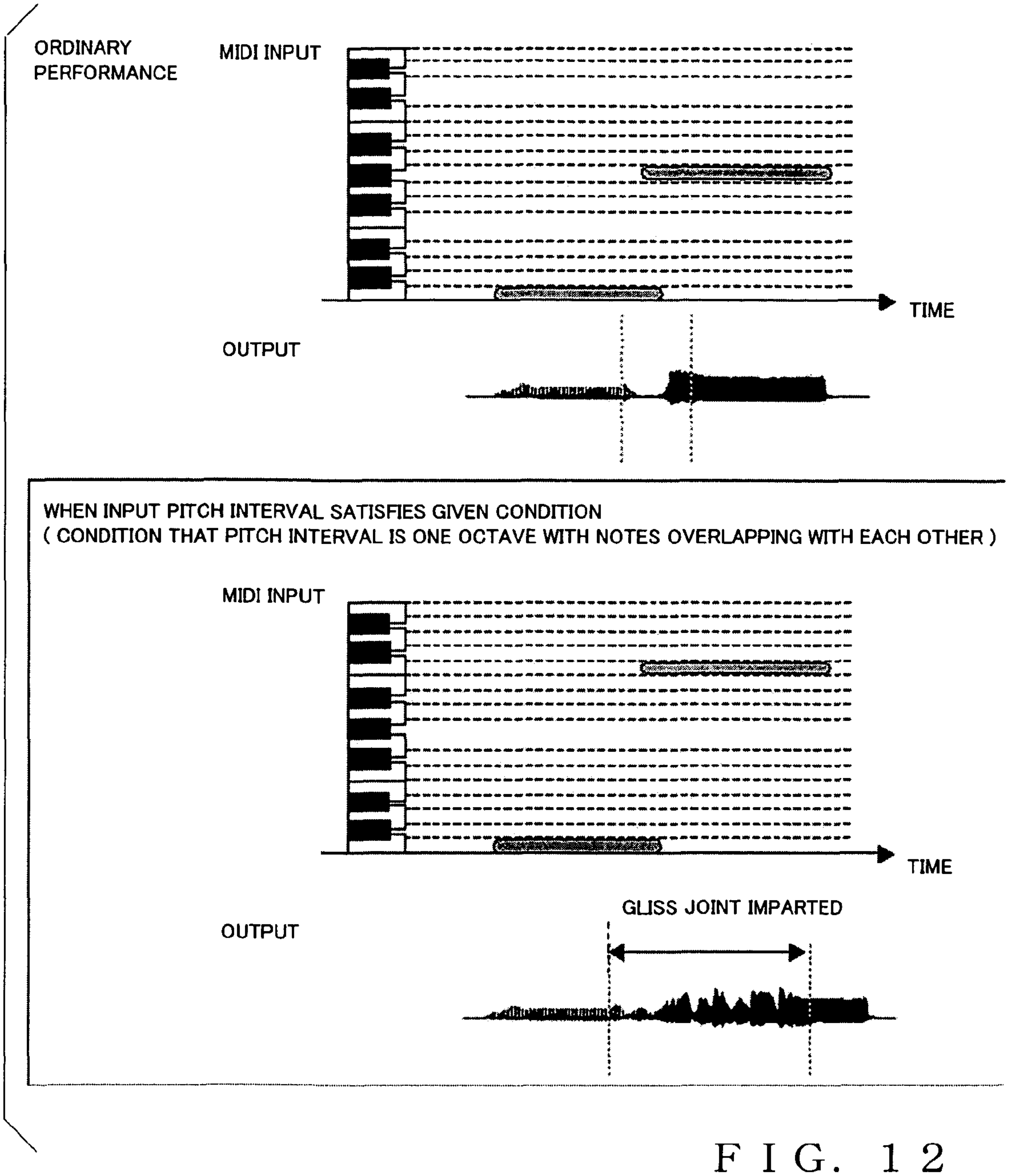
FIG. 12 is a conceptual diagram showing envelopes of output tone waveforms when the rendition style switches assigned in accordance with the determination condition list data illustrated in FIG. 3B are operated.

As seen from a lower block of FIG. 12, when rendition style switch ⑥ assigned in accordance with the determination condition list data of FIG. 3B has been activated prior to note-on timing of a second tone in the input MIDI information, and if a tone pitch difference (pitch interval) between the first and second tones in the input MIDI information is one octave and note-on event data of the second tone has been input prior to note-off timing of the first tone (i.e., the first and second tones overlap with each other), respective waveforms of the first and second tones are interconnected to generate a tone waveform of a gliss joint rendition style. Namely, in the case where rendition style switches assigned in accordance with the determination condition list data of FIG. 3B are used, the user can not only designate rendition styles of individual tone portions by just operating the corresponding rendition style switches but also apply a different rendition style depending on a current performance status (in this case, pitch interval).

Figure 13:
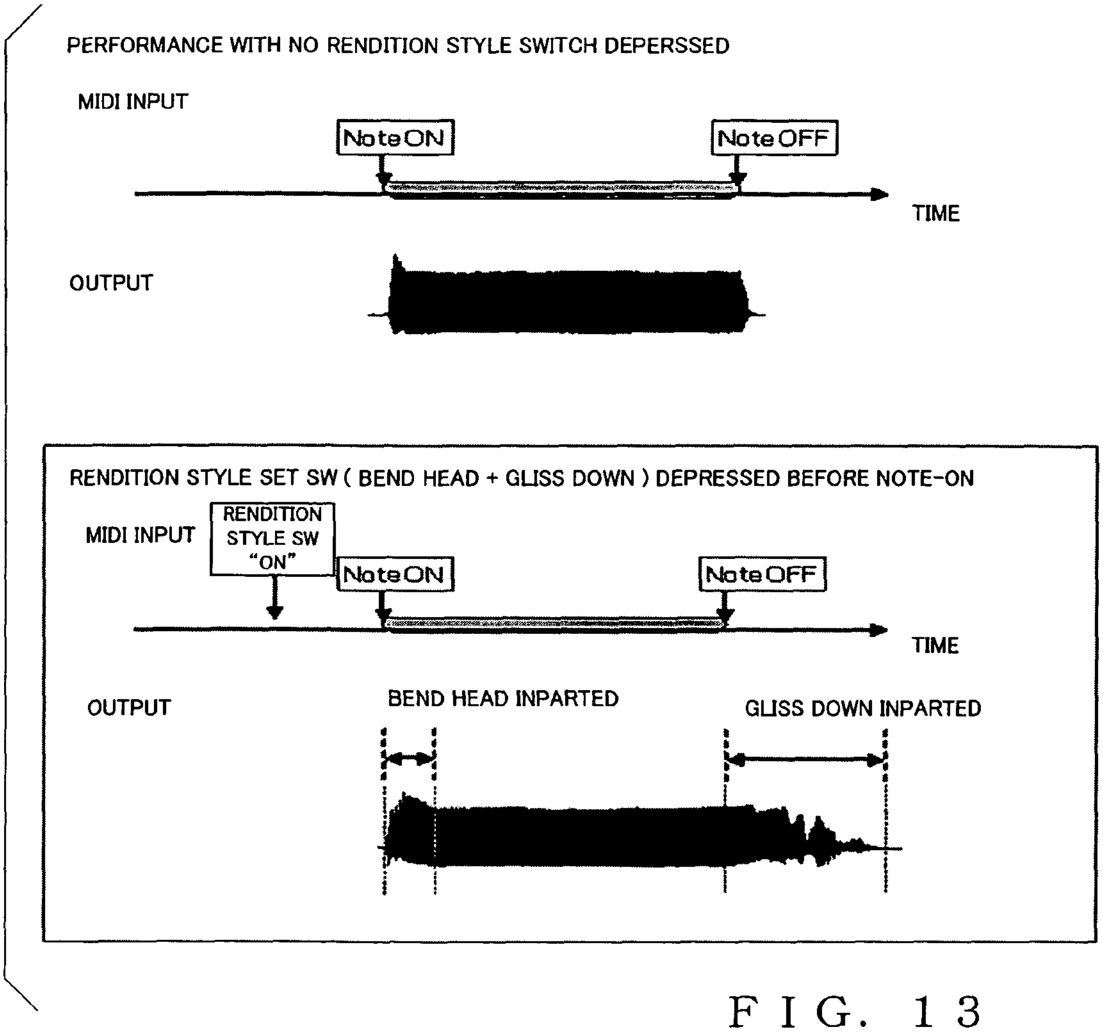
FIG. 13 is a conceptual diagram showing envelopes of output tone waveforms when the rendition style switches assigned in accordance with the determination condition list data illustrated in FIG. 3C are operated.

As seen from FIG. 13, when rendition style switch ⑧ assigned in accordance with the determination condition list data of FIG. 3C has been activated prior to corresponding note-on timing, a tone waveform is generated, by only the ON operation of rendition style switch ⑧, with a bendup attack rendition style and glissdown rendition style imparted to the attack portion and release portion, respectively, of a tone waveform shown in the upper region of FIG. 13. Namely, when rendition style switch ⑧ has been turned on prior to the corresponding note-on timing, a plurality of output control changes are output at the note-on timing with respect to individual rendition styles to be imparted in accordance with the determination condition list data of FIG. 3C. Namely, in the case where rendition style switches assigned in accordance with the determination condition list data of FIG. 3C are used, the user can simultaneously designate rendition styles for a plurality of tone portions by only one operation of any one of the assigned rendition style switches.

Figures 14, 15:
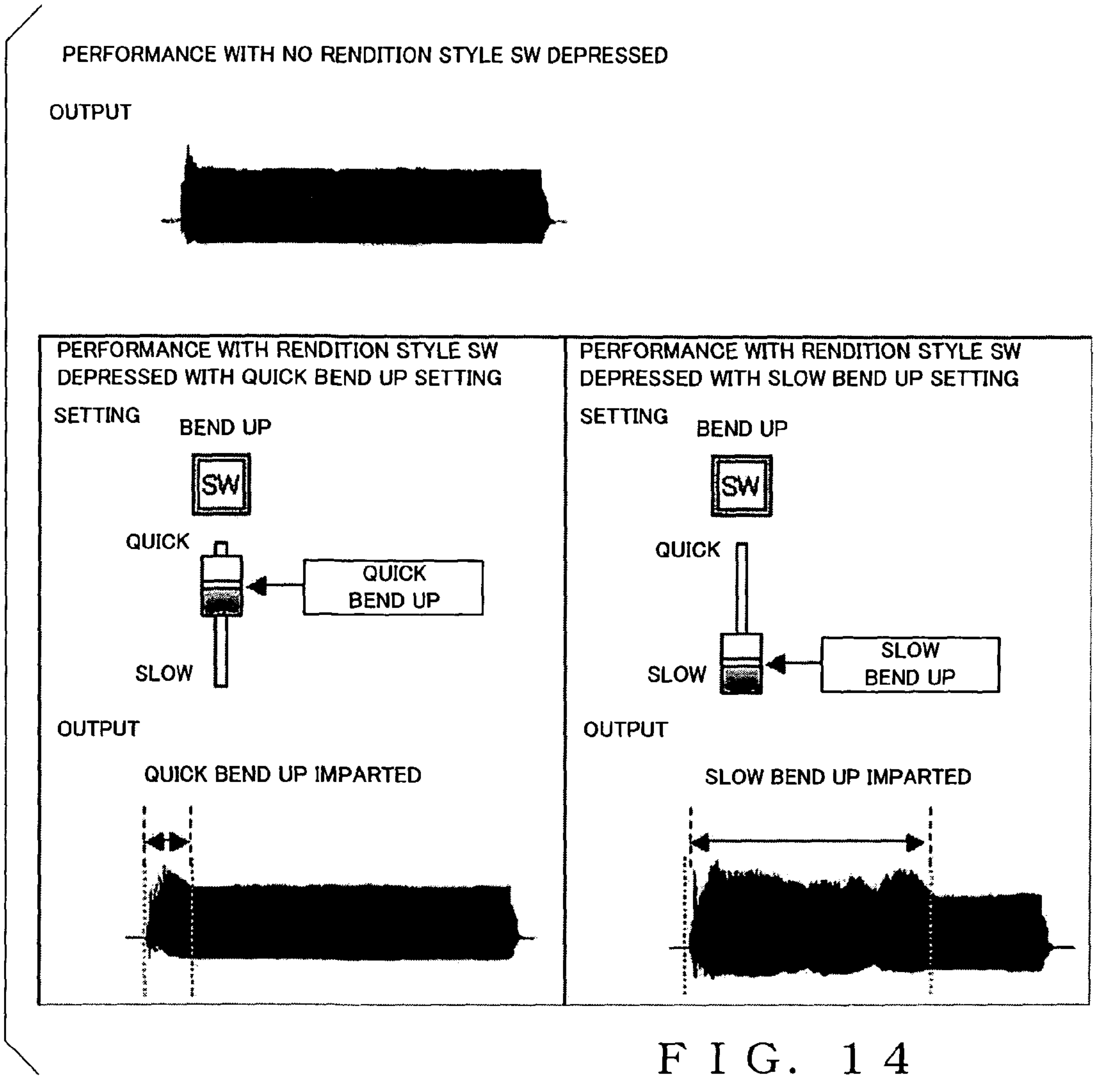
FIG. 14 is a conceptual diagram showing envelopes of output tone waveforms when the rendition style switches assigned in accordance with the determination condition list data illustrated in FIG. 3D are operated.
FIG. 15 is a conceptual diagram showing an example of data definitions for a plurality of switches assigned to function as rendition style sliders.

As seen from FIG. 14, when rendition style switch ① assigned in accordance with the determination condition list data of FIG. 3D has been activated prior to corresponding note-on timing and one of the assigned rendition style sliders has been operated to designate a bendup in an increasing direction, a tone waveform is generated with a fast bendup attack rendition style imparted to the attack portion of a tone waveform illustrated in the upper region of FIG. 14 (see a lower left block of FIG. 14). Conversely, if one of the assigned rendition style sliders has been operated to designate a bendup in a decreasing direction, a tone waveform is generated with a slow bendup attack rendition style imparted to the attack portion of the tone waveform illustrated in the upper region of FIG. 14 (see a lower left block of FIG. 14). Namely, when rendition style switch ① has been activated prior to corresponding note-on timing and one of the assigned rendition style sliders has been operated, an output control change is output at the note-on timing in accordance with an operated amount of the rendition style slider and the determination list data, so that a rendition style module corresponding to the output control change is used. Namely, in the case where rendition style switches assigned in accordance with the determination condition list data of FIG. 3D are used, the user can designate a rendition style of different degree of variation depending on the operated amount of a rendition style slider, by not only operating one of the assigned rendition style switches but also operating one of the assigned rendition style sliders.

It should be appreciated that the rendition style sliders need not necessarily be in the form of actual sliders that output control information corresponding to their operated amount and they may be replaced with a plurality of switches for each of which a controller number and controller value is defined as illustratively shown in FIG. 15. Namely, there may be provided in advance a plurality of switches having a same controller number and different controller values allocated thereto, so that the user can depress, in accordance with a desired operated amount, any one of the switches, having a predetermined controller value corresponding to a desired operated amount, so that the depressed switch can be caused to function as a rendition style slider.

Whereas the embodiments have been described as synthesizing a tone on the basis of MIDI information, such as note-on and note-off event data, supplied from the performance operator unit 5, the present invention is so not limited. For example, the present invention may of course be arranged to synthesize a tone on the basis of, for example, composition data of a music piece that comprise a plurality of MIDI information prestored in the external storage device 4 or the like in order of performance. Namely, the rendition style impartment may be controlled by appropriately operating the rendition style switches in accordance with a performance of the music piece based on the composition data, rather than by operating the rendition style switches in accordance with performance on the keyboard. Further, there may be prestored only MIDI information based on operation of the rendition style switches so that the rendition style impartment can be controlled automatically; in this case, the user only has to perform the keyboard.

Further, the rendition style determination processing performed in the present invention has been described above as producing no output control change to designate a rendition style when no determination condition list data is found as coinciding with the controller value as a result of the comparison between the input value definition of the determination condition list data and the controller value or when the calculated tone pitch difference does not satisfy the validity condition, because no rendition style to be imparted can be determined. In such a case, the tone synthesis section G may use default rendition styles. Namely, when no rendition style has been designated to the performance interpretation processing (player) in the tone synthesis processing, i.e. when there has been received no output control change to designate a rendition style, there may be generated, as defaults, rendition style IDs that designate normal attack and normal body rendition styles at note-on timing and designate a normal release rendition style at note-off timing, and the thus-generated rendition style IDs may be output to the rendition style synthesis processing (articulator). If no joint rendition style has been designated when supplied MIDI information represents a slur rendition style, there may be generated, as a default, a rendition style ID designating a slur at second note-on timing in the slur, and the thus-generated rendition style ID may be output to the rendition style synthesis processing (articulator).

Furthermore, whereas the rendition style determination processing performed in the present invention has been described above as determining a body rendition style at corresponding note-on timing, the present invention is not so limited. For example, arrangements may be made such that a trigger, generated by the tone synthesis section G at timing when the tone synthesis section G requires a body rendition style, can be input to the rendition style determination section M1 so that the rendition style determination section M1 can determine a body rendition style in response to the input trigger.

In summary, the present invention is characterized by allowing the user to designate a desired rendition style for each tone portion by operation of any one of the rendition style switches. Thus, the present invention can generate a characteristic tone waveform, having any of various rendition styles (or various types of articulation) duly reflected therein, with increased ease and with ample controllability.

What is claimed is:

1. A rendition style determination apparatus comprising:

a performance information acquisition section that acquires tone performance information;

a rendition style selector operable in real time by a user to select, with respect to the tone performance information acquired by said performance information acquisition section, a desired rendition style from among a plurality of rendition styles associated with a plurality of portions of tones;

a rendition style determination section that, in response to rendition style selecting operation performed via said rendition style selector, determines a rendition style to be applied to each portion of a tone;

an output section that outputs performance information designating a rendition style module corresponding to the rendition style determined by said rendition style determination section, the rendition style module defining a waveform characteristic to provide the rendition style corresponding thereto; and a rendition style synthesis section that generates a rendition style waveform on the basis of the performance information designating the rendition style module outputted by said output section, wherein individual portions of a tone having rendition style characteristics are generated in a sequentially combined form, in accordance with a time-serial combination of rendition style waveforms corresponding to rendition style modules outputted by said output section.

2. A rendition style determination apparatus as claimed in claim 1, wherein, in response to rendition style selecting operation performed via said rendition style selector, said rendition style determination section determines a performance condition corresponding to the tone performance information acquired by said performance information acquisition section.

3. A rendition style determination apparatus as claimed in claim 1, wherein said performance information acquisition section acquires tone performance information supplied in response to a performance via a performance operation section.

4. A rendition style determination apparatus as claimed in claim 1, wherein said performance information acquisition section acquires tone performance information outputted in accordance with an automatic performance sequence.

5. A rendition style determination apparatus as claimed in claim 1 which further comprises a controller operable by the user to control a rendition style, and wherein said rendition style determination section determines a rendition style in accordance with a combination of rendition style selecting operation performed via said rendition style selector and a control value of said controller.

6. A rendition style determination apparatus as claimed in claim 1, wherein the tone performance information is performance information of a MIDI format, and said output section outputs, in the MIDI format, the performance information designating the rendition style module, by incorporating the performance information in a stream of the tone performance information.

7. A rendition style determination apparatus as claimed in claim 1 wherein said rendition style selector includes a plurality of switches and a switch function assignment section that assigns at least one of the plurality of switches as a rendition style selecting switch.

8. A rendition style determination apparatus as claimed in claim 1 wherein said rendition style selector includes a plurality of multi-function switches and a display that displays functions of each of the multi-function switches, and wherein, in accordance with a voice selected for a performance tone, the multi-function switches function as switches for selecting rendition styles usable for the selected voice, and respective names of rendition styles selectable by each of the multi-function switches are displayed on said display.

9. A rendition style determination apparatus as claimed in claim 1 wherein said rendition style selector is capable of selecting any one of at least a bendup rendition style and glissup rendition style for an attack portion of a tone, at least a vibrato rendition style for a body portion of a tone, any one of at least a benddown rendition style and glissdown rendition style for a release portion of a tone, and at least a slur rendition style for a joint portion of a tone.

10. The rendition style determination apparatus of claim 1, further comprising a second rendition style selector operable by a user to collectively select a combination of a plurality of different rendition styles associated with different portions of a tone, wherein, in response to rendition style selecting operation performed via said second rendition style selector, said rendition style determination section collectively determines rendition styles to be applied to individual portions of a tone, and wherein said output section outputs performance information designating rendition style modules corresponding to said rendition styles determined by said rendition style determination section, the rendition style modules each defining a waveform characteristic to provide the rendition style corresponding thereto.

11. A rendition style determination apparatus comprising:

a performance information acquisition section that acquires tone performance information;

a rendition style selector operable in real time by a user to select, with respect to the tone performance information acquired by said performance information acquisition section, a desired rendition style from among a plurality of rendition styles associated with a plurality of portions of tones;

a rendition style determination section that, in response to rendition style selecting operation performed via said rendition style selector, determines a rendition style to be applied to each portion of a tone; and an output section that outputs performance information designating a rendition style module corresponding to the rendition style determined by said rendition style determination section, the rendition style module defining a waveform characteristic to provide the rendition style corresponding thereto wherein the performance information includes event data indicative of a note-on or note-off event, said rendition style determination section determines a rendition style to be performed in correspondence with event timing indicated by the event data or other timing before or after the event timing, and said output section outputs the performance information designating, the rendition style module corresponding to the rendition style determined by said rendition style determination section, in association with predetermined timing when the determined rendition style is to be performed.

12. A rendition style determination apparatus comprising:

a rendition style selector operable by a user to select a desired rendition style;

a performance event acquisition section that acquires a performance event;

a rendition style determination section that, in response to rendition style selecting operation performed via said rendition style selector, determines a rendition style suitable for a portion of a tone to be generated that is determined in accordance with the performance event acquired by said performance event acquisition section, timing for determining the rendition style being determined by a type, and timing of the performance event; and an output section that outputs performance information, designating a rendition style module corresponding to the rendition style determined by said rendition style determination section, in association with predetermined timing when the performance information is to be performed, the rendition style module defining a waveform characteristic to provide the rendition style corresponding thereto.

13. A rendition style determination apparatus as claimed in claim 11 wherein the performance event includes an event indicative of timing to start tone generation or an event indicative of timing to start tone deadening.

14. A rendition style determination apparatus as claimed in claim 11 wherein said output section outputs the performance information, designating a rendition style module corresponding to the rendition style determined by said rendition style determination section in correspondence with the portion of the tone, by incorporating the performance information in a stream of the performance events in association with the predetermined timing.

15. A program embodied in a computer-readable medium, said program including a group of instructions for causing a computer to perform rendition style determination processing, said rendition style determination processing comprising:

a step of detecting when rendition style selecting operation is performed, via a rendition style selector operable by a user, to select a desired rendition style from among a plurality of rendition styles associated with a plurality of portions of tones;

a step of, in response to the rendition style selecting operation performed via said rendition style selector, determining a rendition style to be applied to each portion of a tone;

a step of outputting performance information designating a rendition style module corresponding to the determined rendition style, the rendition style module defining a waveform characteristic to provide the rendition style corresponding thereto; and a step of generating a rendition style waveform on the basis of the performance information designating the rendition style module outputted by said output section, wherein individual portions of a tone having rendition style characteristics are generated in a sequentially combined form, in accordance with a time-serial combination of rendition style waveforms corresponding to rendition style modules outputted by step of outputting.

16. The program of claim 15, wherein said rendition style determination processing further comprising a step of detecting when rendition style selecting operation is performed, via a second rendition style selector operable by a user, to collectively select a combination of a plurality of different rendition styles associated with different portions of a tone, and wherein, in response to the rendition style selecting operation performed via said second rendition style selector, said step of determining collectively determines rendition styles to be applied to individual portions of a tone, and wherein said step of outputting outputs performance information designating rendition style modules corresponding to the determined rendition styles, the rendition style modules each defining a waveform characteristic to provide the rendition style corresponding thereto.

17. A program embodied in a computer-readable medium, said program including a group of instructions for causing a computer to perform rendition style determination processing, said rendition style determination processing comprising:

a step of detecting when rendition style selecting operation is performed, via a rendition style selector operable by a user, to select a desired rendition style;

a step of acquiring a performance event;

a step of, in response to the rendition style selecting operation performed via said rendition style selector, determining a rendition style suitable for a portion of a tone to be generated that is determined in accordance with the performance event acquired by said step of acquiring; and a step of outputting performance information, designating a rendition style module corresponding to the determined rendition style, in association with predetermined timing when the performance information is to be performed, the rendition style module defining a waveform characteristic to provide the rendition style corresponding thereto.

* * * * *